(12) United States Patent
Ikeda et al.

(10) Patent No.: US 11,209,708 B2
(45) Date of Patent: Dec. 28, 2021

(54) DISPLAY DEVICE

(71) Applicant: Japan Display Inc., Tokyo (JP)

(72) Inventors: Kojiro Ikeda, Tokyo (JP); Tenfu Nakamura, Tokyo (JP); Kentaro Okuyama, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/212,299

(22) Filed: Mar. 25, 2021

(65) Prior Publication Data

US 2021/0302796 A1 Sep. 30, 2021

(30) Foreign Application Priority Data

Mar. 25, 2020 (JP) .............................. JP2020-054363

(51) Int. Cl.
*G02F 1/1368* (2006.01)
*G02F 1/1362* (2006.01)

(52) U.S. Cl.
CPC ...... *G02F 1/136286* (2013.01); *G02F 1/1368* (2013.01)

(58) Field of Classification Search
CPC ................................................ G02F 1/136286
See application file for complete search history.

(56) References Cited

U.S. PATENT DOCUMENTS

| 2012/0075326 A1* | 3/2012 | Tsuchiya .............. G02B 6/0058 345/589 |
| 2016/0231497 A1* | 8/2016 | Kato .................... G02B 6/0035 |
| 2017/0031187 A1 | 2/2017 | Douyou |
| 2019/0079324 A1* | 3/2019 | Numata ............ G02F 1/133512 |
| 2019/0302496 A1 | 10/2019 | Okuyama |

FOREIGN PATENT DOCUMENTS

| JP | 2017-032782 A | 2/2017 |
| JP | 2019-174531 A | 10/2019 |

* cited by examiner

*Primary Examiner* — Sang V Nguyen
(74) *Attorney, Agent, or Firm* — K&L Gates LLP

(57) ABSTRACT

According to one embodiment, a display device includes a display area including a liquid crystal layer disposed in a display area, the liquid crystal layer including a polymer and a liquid crystal molecule, wherein when a direction of light incident on the display area from a light source element is defined as an incident direction and a direction in which pixels are selected sequentially is defined as a scan direction, the incident direction is opposite to the scan direction, and a direction in which the polymer extends linearly crosses both the incident direction and the scan direction.

14 Claims, 24 Drawing Sheets

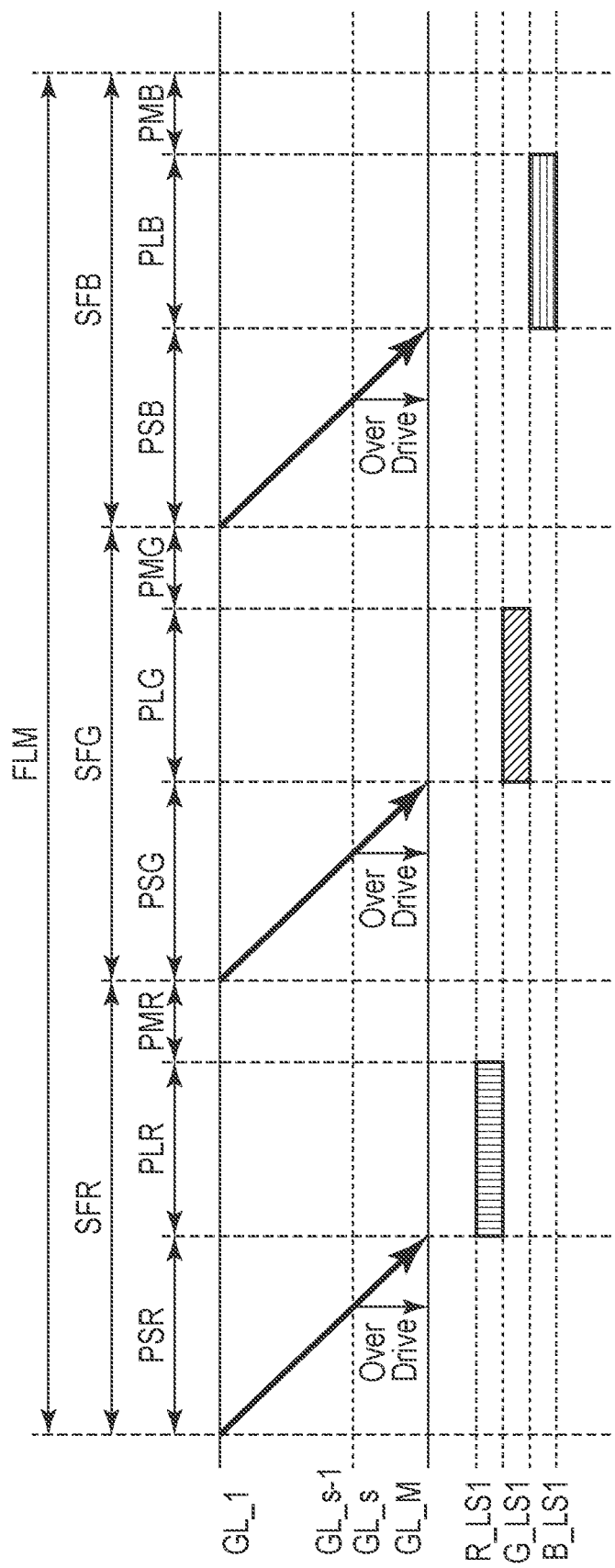
F I G. 23

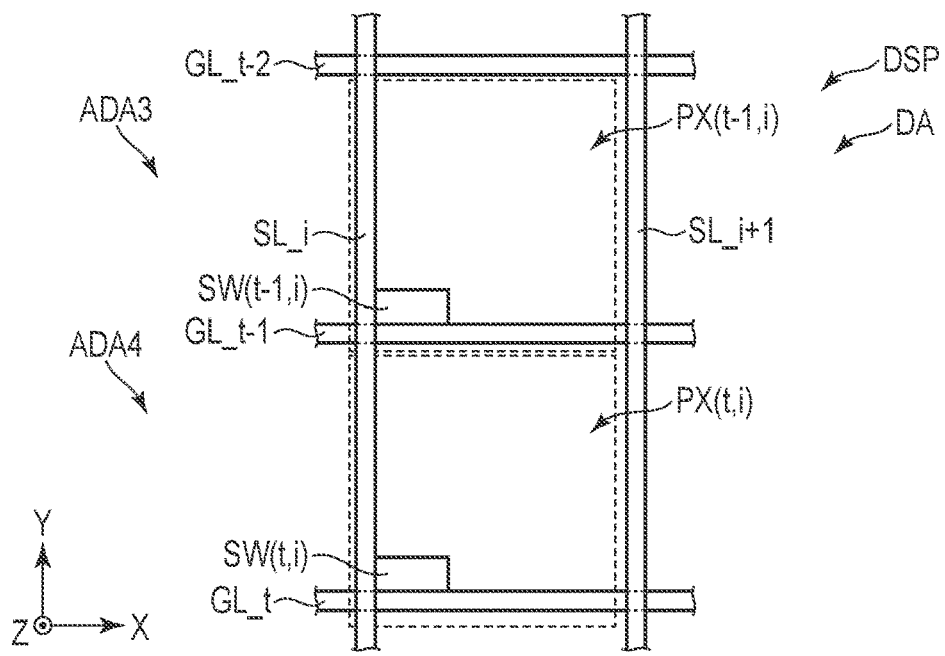
F I G. 24A
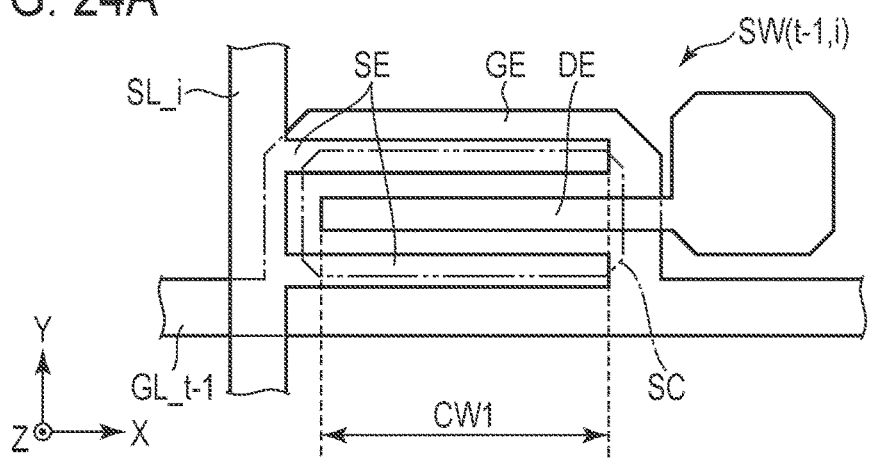
F I G. 24B
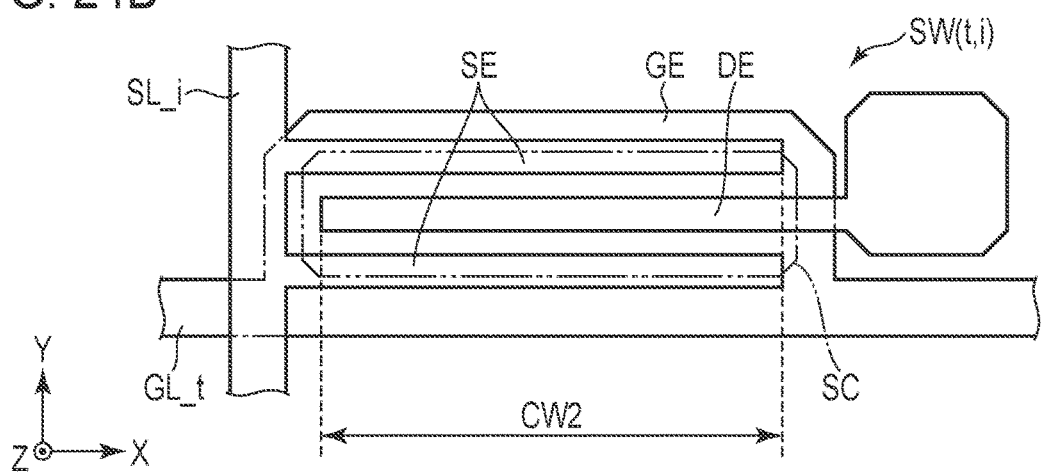
F I G. 24C

DISPLAY DEVICE

CROSS-REFERENCE TO RELATED APPLICATIONS

This application is based upon and claims the benefit of priority from Japanese Patent Application No. 2020-054363, filed Mar. 25, 2020, the entire contents of which are incorporated herein by reference.

FIELD

Embodiments described herein relate generally to a display device.

BACKGROUND

In recent years, display devices using polymer dispersed liquid crystals (hereinafter, may be referred to as PDLC) in which a scattering state in which incident light is scattered and a transmissive state in which incident light is transmissive can be switched are proposed.

SUMMARY

The present disclosure relates generally to a display device.

According to an embodiment, a display device includes a display area including a liquid crystal layer disposed in a display area, the liquid crystal layer including a polymer and a liquid crystal molecule, wherein when a direction of light incident on the display area from a light source element is defined as an incident direction and a direction in which pixels are selected sequentially is defined as a scan direction, the incident direction is opposite to the scan direction, and a direction in which the polymer extends linearly crosses both the incident direction and the scan direction.

BRIEF DESCRIPTION OF THE DRAWINGS

FIG. 23 illustrates a display operation.

FIG. 24A illustrates another example of the structure of the display device of the embodiment.

FIG. 24B illustrates another example of the structure of the display device of the embodiment.

FIG. 24C illustrates another example of the structure of the display device of the embodiment.

DETAILED DESCRIPTION

Figure 1:
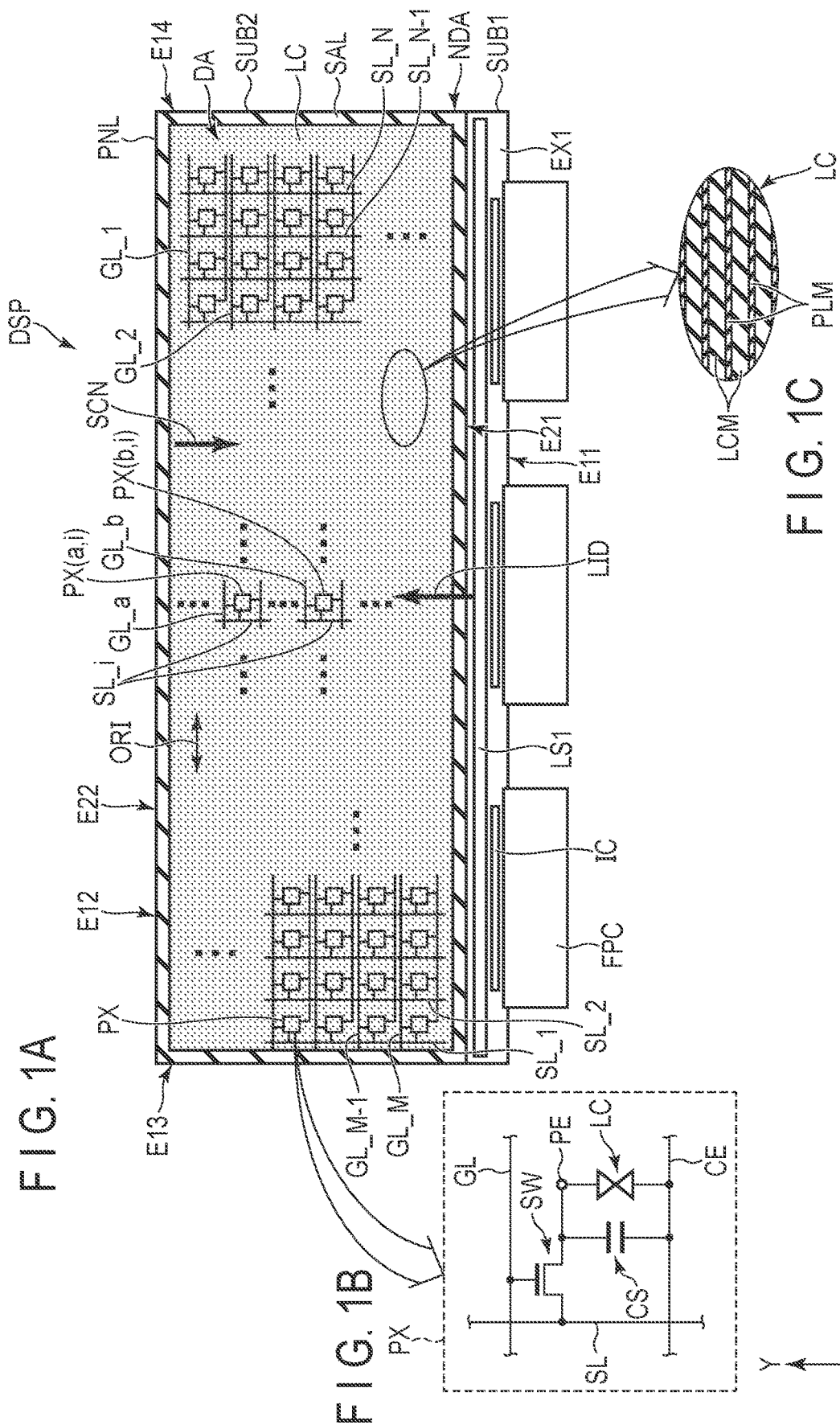
FIG. 1A is a plan view of an example of the structure of a display device of an embodiment.
FIG. 1B is a plan view of an example of the structure of the display device of the embodiment.
FIG. 1C is a plan view of an example of the structure of the display device of the embodiment.

In general, according to one embodiment, a display device includes a display area including a plurality of scan lines, signal lines, and pixels; a first side surface and a second side surface opposed to each other, the first side surface being positioned along a part of a first end of the display area, and the second side surface being positioned along a part of a second end of the display area; a light source element disposed to be adjacent to the first side surface; and a liquid crystal layer disposed in the display area, the liquid crystal layer including a polymer and a liquid crystal molecule, wherein when a direction of light incident on the display area from the light source element is defined as an incident direction and a direction in which the pixels are selected sequentially is defined as a scan direction, the incident direction is opposite to the scan direction, and a direction in which the polymer extends linearly crosses both the incident direction and the scan direction.

Furthermore, according to an embodiment, a display device includes a display area including a plurality of scan lines, signal lines, and pixels; a first side surface and a second side surface opposed to each other, the first side surface being positioned along a part of a first end of the display area, and the second side surface being positioned along a part of a second end of the display area; a first light source element and a second light source element disposed to be adjacent to the first side surface and the second side surface, respectively; and a liquid crystal layer disposed in the display area, the liquid crystal layer including a polymer and a liquid crystal molecule, wherein brightness of the first light source element is higher than brightness of the second light source element, when a direction of light incident on the display area from the first light source element is defined as a first incident direction, a direction of light incident on the display area from the second light source element is defined as a second incident direction, and a direction in which the pixels are selected sequentially is defined as a scan direction, the first incident direction is opposite to the scan direction, and a direction in which the polymer extends linearly crosses the first incident direction, second incident direction, and the scan direction. Furthermore, according to an embodiment, a display device includes a display area including a plurality of scan lines, signal lines, and pixels; a first side surface and a second side surface opposed to each other, the first side surface being positioned along a part of a first end of the display area, and the second side surface being positioned along a part of a second end of the display area; a first light source element and a second light source element disposed to be adjacent to the first side surface and the second side surface, respectively; and a liquid crystal layer disposed in the display area, the liquid crystal layer including a polymer and a liquid crystal molecule, wherein the plurality of scan lines include a first scan line group closer to the first light source element than to the second light source element, and a second scan line group closer to the second light source element than to the first light source element, the plurality of pixels include a first pixel group connected to the first scan line group and a second pixel group connected to the second scan line group, when a direction of light incident on the display area from the first light source element is defined as a first incident direction, a direction of t light incident on the display area from the second light source element is defined as a second incident direction, a direction of in which pixels in the first pixel group selected sequentially is defined as a first scan direction, and a direction in which pixels in the second pixel group selected sequentially is defined as a second scan direction, the first incident direction is opposite to the first scan direction, and the second incident direction is opposite to the second scan direction, and a direction in which the polymer extends linearly crosses the first incident direction, second incident direction, first scan direction, and second scan direction. Furthermore, according to an embodiment, a display device includes: a display area including at least a first pixel and a second pixel, a first light source element disposed to be adjacent to a first side surface of the display area, and a liquid crystal layer disposed in the display area, the liquid crystal layer including a polymer and a liquid crystal layer, wherein the first pixel and the second pixel are arranged along a first incident direction on which light from the first light source element is incident, the second pixel is closer to the first light source element than is the first pixel, the first pixel and the second pixel become an on state in this order, and a direction in which the polymer extends linearly crosses the first incident direction.

According to the embodiments, a display device which can improve the display quality can be presented.

Embodiments will be described hereinafter with reference to the accompanying drawings. The disclosure is merely an example, and proper changes within the spirit of the invention, which are easily conceivable by a skilled person, are included in the scope of the invention as a matter of course. In some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. In the specification and drawings, the same elements as those described in connection with preceding drawings are denoted by like reference numerals, and a detailed description thereof may be omitted.

A display device of an embodiment will be explained in detail with reference to the accompanying drawings.

In the embodiments, a first direction X, second direction Y, and third direction Z cross each other. The first direction X, second direction Y, and third direction Z may be orthogonal to each other, or may cross each other at an angle other than 90 degrees. A direction toward the tip of arrow of the third direction Z will be defined as up or above, and a direction opposite to the direction toward the tip of arrow of the third direction Z will be defined as low or below.

Furthermore, phrases such as "a second member above a first member" and "a second member below a first member" may be interpreted as the second member contacting the first member or as the second member apart from the first member. In the latter case, a third member may be interposed between the first member and the second member. On the other hand, phrases such as "a second member on a first member" and "a second member under a first member" will be interpreted as the second member contacting the first member.

Furthermore, an observation position to observe a display device DSP is hypothetically set in the tip side of arrow of the third direction Z, and seeing an X-Y plan view defined by the first direction X and the second direction Y from the observation position will be referred to as plan view. Seeing a cross-sectional view of the display device DSP along an X-Z plan view defined by the first direction X and the third direction Z, or along a Y-Z plan view defined by the second direction Y and the third direction Z will be referred to as cross-sectional view.

EMBODIMENT

FIGS. 1A to 1C are plan views of examples of the structure of the display device DSP of the embodiment. FIG. 1A is a plan view of the display device DSP. As in FIG. 1A, the display device DSP includes a display panel PNL with a polymer dispersed liquid crystal layer (hereinafter will be referred to as liquid crystal layer LC), line substrate FPC, circuit element IC, and light source element LS1. Note that, the liquid crystal layer LC of FIG. 1A is a reverse polymer dispersed liquid crystal layer. The display panel PNL includes a pair of side surfaces E11 and E12 extending in the first direction X, and a pair of side surfaces E13 and E14 extending in the second direction Y. In the display device DSP of FIG. 1A, the side surfaces E11 and E12 are side surfaces formed along the long side, and the side surfaces E13 and E14 are side surfaces formed along the short side.

The display panel PNL includes a substrate SUB1, substrate SUB2, liquid crystal layer LC, and seal SAL. The substrates SUB1 and SUB2 overlap each other in a plan view. The substrates SUB1 and SUB2 are adhered with the seal SAL. The liquid crystal layer LC is maintained between the substrates SUB1 and SUB2 and sealed by the seal SAL.

The display panel PNL includes a display area DA to display an image and a frame-like non-display area NDA surrounding the display area DA. The seal SAL is positioned in the non-display area NDA. The display area DA includes pixels PX arranged in a matrix in the first direction X and the second direction Y.

Furthermore, the display panel PNL includes, in the display area DA, a plurality of scan lines GL (GL_1 to GL_M), a plurality of signal lines SL (SL_1 to SL_N), and common electrode CE on a base BA1. The pixels PX are provided with crossing points of the scan lines GL and the signal lines SL. Note that, in the present embodiment, the numbers of scan lines GL and signal lines SL are M and N, respectively. That is, the display panel PNL includes M×N pixels PX.

The scan lines GL each extend in the first direction X, and are arranged in the second direction Y at intervals. The signal lines SL each extend in the opposite direction of the second direction Y, and are arranged in the first direction X at intervals.

FIG. 1B illustrates a circuit structure of FIG. 1A. As in FIG. 1B, each pixel PX includes a switching element SW, pixel electrode PE, common electrode CE, and liquid crystal layer LC, for example. The switching element SW is formed of a thin film transistor (TFT), for example, and is electrically connected to the scan line GL and the signal line SL. The scan line GL is electrically connected to the switching element SW of each pixel PX arranged in the first direction X. The signal line SL is electrically connected to the switching element SW of each pixel PX arranged in the opposite direction of the second direction Y.

The pixel electrode PE is electrically connected to the switching element SW. The common electrode CE is commonly provided with the pixel electrodes PE. The liquid crystal layer LC (specifically, liquid crystal molecules LCM) is driven by a field produced between the pixel electrode PE and the common electrode CE. Specifically, the same potential is applied to the common electrode CE in the pixels PX, and a voltage is applied to the pixel electrode PE of each pixel PX. The capacitance CS is formed, for example, between electrodes having the same potential as the common electrode CE, and electrodes having the same potential as the pixel electrode PE.

The scan line GL, signal line SL, switching element SW, and pixel electrode PE are provided with the substrate SUB1, and the common electrode CE is provided with the substrate SUB2. In the substrate SUB1, the scan line GL and the signal line SL are electrically connected to the line substrate FPC, or the circuit element IC.

In the display panel PNL, the substrate SUB2 includes a side surface E21 and a side surface E22 opposite to the side surface E21. The side surfaces E21 and E22 extend in the first direction X. In FIG. 1A, the side surfaces E21 and E22 are side surfaces formed along the long side of the substrate SUB2. The side surfaces E21 and E22 are parallel to each other and are opposed to each other.

The substrate SUB1 includes an extension Ex1 which does not overlap the substrate SUB2. The extension Ex1 corresponds to a part of the substrate SUB1 extending in the second direction Y from the side surface E21.

The line substrate FPC and the circuit element IC are mounted on the extension Ex1. The line substrate FPC is, for example, a flexible print circuit which can be bent. The circuit element IC includes, for example, a display driver configured to output signals required for image display such as scan signals and image signals. The display driver outputs the signals required for image display to control the image display. Thus, the display driver and the circuit element IC including the display driver may be regarded as a control unit of the display panel PNL (and the display device DSP). Note that the circuit element IC may be mounted on the line substrate FPC. In the example of FIG. 1A, a plurality of line substrates FPC are applied; however, a single line substrate FPC may be applied. Furthermore, although a plurality of circuit elements IC are applied, a single circuit element IC may be applied.

While the details will be described later, the light source element LS1 is each provided along the side surface (or end) of the display panel PNL. In the example of FIGS. 1A and 1B, the light source element LS1 overlaps the extension Ex1 in a plan view, and is disposed along the side surface E21 of the substrate SUB2, and emits light to the side surface E21. In FIGS. 1A and 1B, a direction of light emitted from the light source element LS1 and incident on the display area DA is an incident direction LID. In the example of FIGS. 1A and 1B, the incident direction LID is a direction parallel to the second direction Y.

Note that, the side surface of the display area DA is parallel to the side surface of the substrate SUB2, and only the seal SAL is disposed between the end of the substrate SUB2 and the end of the display area DA. Thus, the light source element LS1 is disposed along the side surface of the display area DA (side surface parallel to the side surface E21 of the substrate SUB2), and emits light to the side surface of the display area DA. Note that, the side surface E21 of the substrate SUB2 is a side surface formed along the long side, and thus, the side surface of the display area DA is a side surface formed along the long side accordingly. Of the side surfaces of the display area DA, two side surfaces formed along the long sides are parallel to each other and are opposed to each other with the display area DA interposed therebetween.

While the details will be described later, the same applies to a case where the light source element LS1 is disposed in the short side of the substrate SUB2. The light source element LS1 is disposed along the side surface formed along the short side of the display area DA, and emits light to the side surface formed along the short side. Furthermore, as with the long side, of the side surfaces of the display area DA, two side surfaces formed along the short side are parallel to each other and are opposed to each other with the display area DA interposed therebetween.

Furthermore, the light source element LS1 includes a red (R) light source element R_LS1, green (G) light source element G_LS1, and blue (B) light source element B_LS1. As will be described later, the display device DSP of the present embodiment can be driven in a so-called field sequential method. In this method, one frame period includes a plurality of sub frame periods (fields). For example, in a case where the red, green, and blue light source elements R_LS1, G_LS1, and B_LS1 as in the present embodiment, one frame period includes red, green, and blue sub frame periods.

Note that, as will be described later, the light source element LS1 may be disposed along the other side surface of the display panel PNL, for example, may be disposed along at least one of the other side surfaces E13 and E14. The side surfaces E13 and E14 include the side surface of the substrate SUB1 and the side surface of the substrate SUB2. In that case, the light source element LS1 may emit light to any side surface of the substrates SUB1 and SUB2, or may emit light to the side surfaces of both the substrates SUB1 and SUB2. Note that, if the light source element LS1 is disposed along at least one or both of the side surfaces E13 and E14, the polymer PLM of the liquid crystal layer LC is formed linearly extending along the second direction Y, and the liquid crystal molecule LCM is aligned such that the major axis thereof is along the second direction Y.

FIG. 1C is a schematic view of FIG. 1A in an enlarged manner. As in FIG. 1C, the liquid crystal layer LC includes the polymer PLM and the liquid crystal molecule LCM. In this example, the polymer PLM is a liquid crystal polymer. The polymer PLM is formed linearly extending in the first direction X and is arranged in the second direction Y. The liquid crystal molecule LCM is dispersed in the gap between the polymers PLM, and the major axis is along the first direction X. Each of the polymer PLM and the liquid crystal molecule LCM has optical isotropy or refractive index isotropy.

The polymer PLM is formed by, for example, polymerizing liquid crystal monomer in a state where being aligned in an alignment direction ORI by alignment restriction force of the alignment films AL1 and AL2. The liquid crystal molecules LCM are scattered in the liquid crystal monomer, and when the liquid crystal monomer is polymerized to be a polymer, are aligned in a predetermined direction depending on the alignment direction of the liquid crystal monomer. The orientation direction ORI is a direction in which the polymer PLM extends linearly, and in the example of FIGS. 1A to 1C, is parallel to the first direction X.

The response of the polymer PLM to a field is less than the response of the liquid crystal molecule LCM to a field. For example, the alignment direction of the polymer PLM hardly changes regardless of the field, and on the other hand, the alignment direction of the liquid crystal molecule LCM changes based on a field if a field higher than a threshold value is applied to the liquid crystal layer LC. If no voltage is applied to the liquid crystal layer LC, optical axes of the polymer PLM and the liquid crystal molecule LCM are parallel to each other, and the light incident on the liquid crystal layer LC passes therethrough with being hardly scattered in the liquid crystal layer LC (transparent state). If a voltage is applied to the liquid crystal layer LC, the optical axes of the polymer PLM and the liquid crystal molecule LCM are orthogonal to each other, and the light incident on the liquid crystal layer LC is scattered in the liquid crystal layer LC (scattering state).

A scan direction SCN of FIGS. 1A to 1C is a direction in which the pixels PX sequentially become an on state. In other words, the scan direction SCN is a direction in which the pixels PX are selected sequentially. Specifically, when a scan signal from the line substrate FPC or the circuit element IC is input to the scan line GL, the switching element SW of the pixel PX becomes an on state. If an image signal is input from the line substrate FPC or the circuit element IC via the signal line SL while the switching element SW is in an on state, a voltage is applied to the pixel electrode PE, and a field is produced between the pixel electrode PE and the common electrode CE.

Furthermore, the scan direction SCN may be interpreted as a direction indicative of the input order of the scan signal to the scan line GL. In other words, the san direction SCN is a direction in which the scan lines GL to which the scan signal is input are sequentially selected. In the present embodiment, the scan direction SCN is an opposite direction of the incident direction LID of the incident light from the light source element LS1, and this point will be described later.

Figure 2:
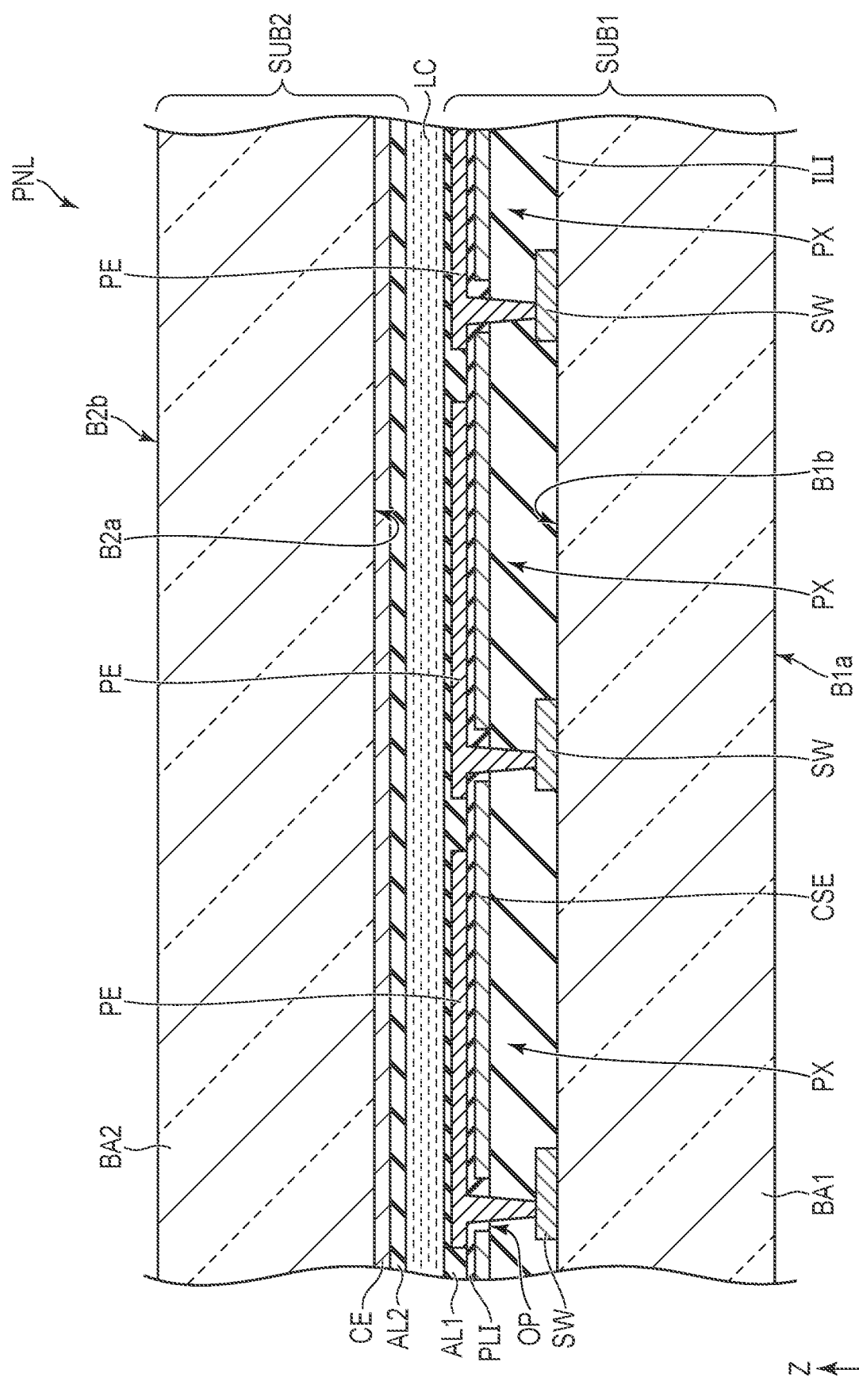
FIG. 2 is a cross-sectional view of an example of the structure of a display panel of FIGS. 1A to 1C.

FIG. 2 is a cross-sectional view of an example of the structure of the display panel PNL of FIGS. 1A to 1C. FIG. 2 shows a cross-section of the display panel PNL in the X-Z plan.

The substrate SUB1 includes a transparent base BA1, insulating layers ILI and PLI, capacitance electrode CSE, switching element SW, pixel electrode PE, and alignment film AL1. The transparent base BA1 includes a main surface (external surface) B1a, and main surface (inner surface) B1b which is opposite to the main surface B1a.

The switching element SW is disposed in the main surface B1b side. The insulating layer ILI is provided with the main surface B1b to cover the switching element SW. Note that, the scan line GL and the signal line SL of FIG. 1A are disposed between the transparent base BA1 and the insulating layer ILI, and the depiction thereof is omitted here. The capacitance electrode CSE is disposed between the insulating layers ILI and PLI. The pixel electrode PE is provided with each pixel PX between the insulating layer PLI and the alignment film AL1. That is, the capacitance electrode CSE is disposed between the transparent base BA1 and the pixel electrode PE.

The pixel electrode PE is electrically connected to the switching element SW via an opening OP of the capacitance electrode CSE. The pixel electrode PE overlaps the capacitance electrode CSE with the insulating layer PLI therebetween to form capacitance CS of the pixel PX. The alignment film AL1 covers the pixel electrode PE. The alignment film AL1 contacts the liquid crystal layer LC.

The substrate SUB2 includes a transparent base BA2, common electrode CE, and alignment film AL2. The transparent base BA2 includes a main surface B2a (inner surface) and main surface B2b (outer surface) which is opposite to the main surface B2a. The main surface B2a of the transparent base BA2 faces the main surface B1b of the transparent base BA1. The common electrode CE is provided with the main surface B2a. The alignment film AL2 covers the common electrode CE. The alignment film AL2 contacts the liquid crystal layer LC.

Note that, in the substrate SUB2, a light shielding layer may be disposed immediately above the switching element SW, scan line GL, and signal line SL. Furthermore, a transparent insulating film may be disposed between the transparent base BA2 and the common electrode CE, or between the common electrode CE and the alignment film AL2. The common electrode CE is disposed over a plurality of pixels PX, and is opposed to the pixel electrodes PE in the third direction Z. Furthermore, the common electrode CE is electrically connected to the capacitance electrode CSE, and has the same potential as the capacitance electrode CSE.

The liquid crystal layer LC is positioned between the pixel electrode PE and the common electrode CE. As described above, the liquid crystal layer LC includes the polymer PLM and the liquid crystal molecule LCM. In the present embodiment, applying a voltage to the pixel electrode PE and the common electrode may be referred to as applying a voltage to the liquid crystal layer LC. The alignment direction of the liquid crystal molecules LCM is changed based on the field produced between the pixel electrode PE and the common electrode CE.

The transparent bases BA1 and BA2 are, for example, a glass substrate, or may be an insulating substrate such as a plastic substrate. The insulating layer ILI contains, for example, a transparent insulating film such as silicon oxide, silicon nitride, and silicon oxynitride, and a transparent organic insulating film such as acrylic resin. The insulating layer PLI is a transparent insulating film such as silicon nitride. The capacitance electrode CSE, pixel electrode PE, and common electrode CE are a transparent electrode formed of a transparent conductive material such as indium tin oxide (ITO) or indium zinc oxide (IZO).

The alignment films AL1 and AL2 are a horizontal alignment film having an alignment restriction force which is substantially parallel to the X-Y plan. As described above, in the example of FIG. 2, the alignment films AL1 and AL2 are subjected to the alignment treatment along the first direction X. Note that the alignment treatment may be a rubbing treatment or an optical alignment treatment. As described above, the direction of the alignment treatment of the alignment films AL1 and AL2 is the alignment direction ORI.

Figure 3:
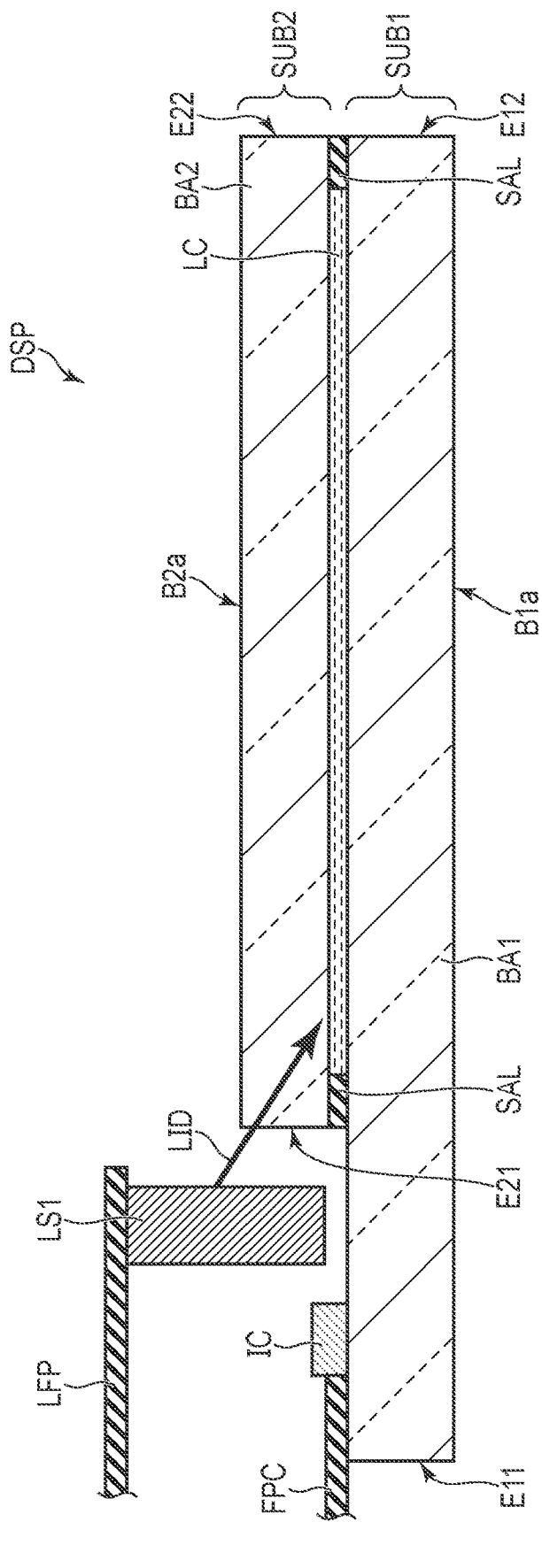
FIG. 3 is a cross-sectional view of an example of the structure of the display device of FIGS. 1A to 1C.

FIG. 3 is a cross-sectional view of an example of the structure of the display device DSP of FIGS. 1A to 1C. FIG. 3 shows a cross-section of the display device DSP in the Y-Z plan. Note that, in FIG. 3, only the main parts of the display device DSP are shown in a simplified manner.

The light source element LS1 is, in the third direction Z, disposed between the base BA1 and the line substrate LFP. The light source element LS1 is electrically connected to the line substrate LFP. The light source element LS1 is driven by the line substrate LFP or a signal input from the outside via the line substrate LFP.

Furthermore, an optical element configured to optically adjust light from the light source element LS1 may be disposed between the light source element LS1 and the base BA1.

Now, light emitted from the light source element LS1 will be explained.

The light source element LS1 emits light to the side surface E21. In the present embodiment, the part to which the light from the light source element LS1 enters will be referred to as a light entrance part. The light emitted from the light source element LS1 propagates along the incident direction LID which is parallel to the second direction Y and enters the base BA2 from the side surface E21.

The light incident on the base BA2 is repeatedly reflected between the bases BA2 and BA1 (substrates SUB2 and SUB1) to propagate inside the display device DSP.

The light entering the liquid crystal layer LC to which no voltage is applied is hardly scattered and passes through the liquid crystal layer LC. Furthermore, the light entering the liquid crystal layer LC to which a voltage is applied is scattered by the liquid crystal layer LC. The display device DSP can be observed from the main surface B2b side, and from the main surface B1a side, too. Furthermore, in either case where the display device DSP is observed from the main surface B2b side or from the main surface B1a side, the background of the display device DSP can be observed through the display device DSP.

However, the light from the light source element LS1 is weakened as the distance from the side surface E21 which is a light entrance part increases. The weakening of the light is mainly caused by optical absorption by various thin films between the bases BA1 and BA2.

Especially, the scan line GL, signal line SL, switching element SW, insulating layer ILI, insulating layer PLI, and alignment films AL1 and AL2 may include a thin film with relatively high light absorption ratio. The incident light is absorbed by such thin films, and the brightness thereof is decreased while reaching the side surfaces E12 and E22 which are the light entrance part and the opposed light entrance part, respectively.

Furthermore, the brightness of the incident light is decreased by the line layers such as scan line GL and signal line SL, and scattering of the electrode layer and the line layer included in the switching element SW.

If the brightness of the incident light decreases from the light entrance part to the opposed light entrance part, there may be a bias in the brightness of the displayed image, and the display quality may be deteriorated.

Furthermore, if the scan direction SCN in which the pixels PX sequentially become an on state is set to the opposed light entrance part (side surfaces E12 and E22) from the light entrance part (side surface E21) side, a desired brightness may possibly not be obtained because the incident light reaches the pixels PX before the alignment direction of the liquid crystal molecules LSM changes. The details thereof will be explained.

Figure 4:
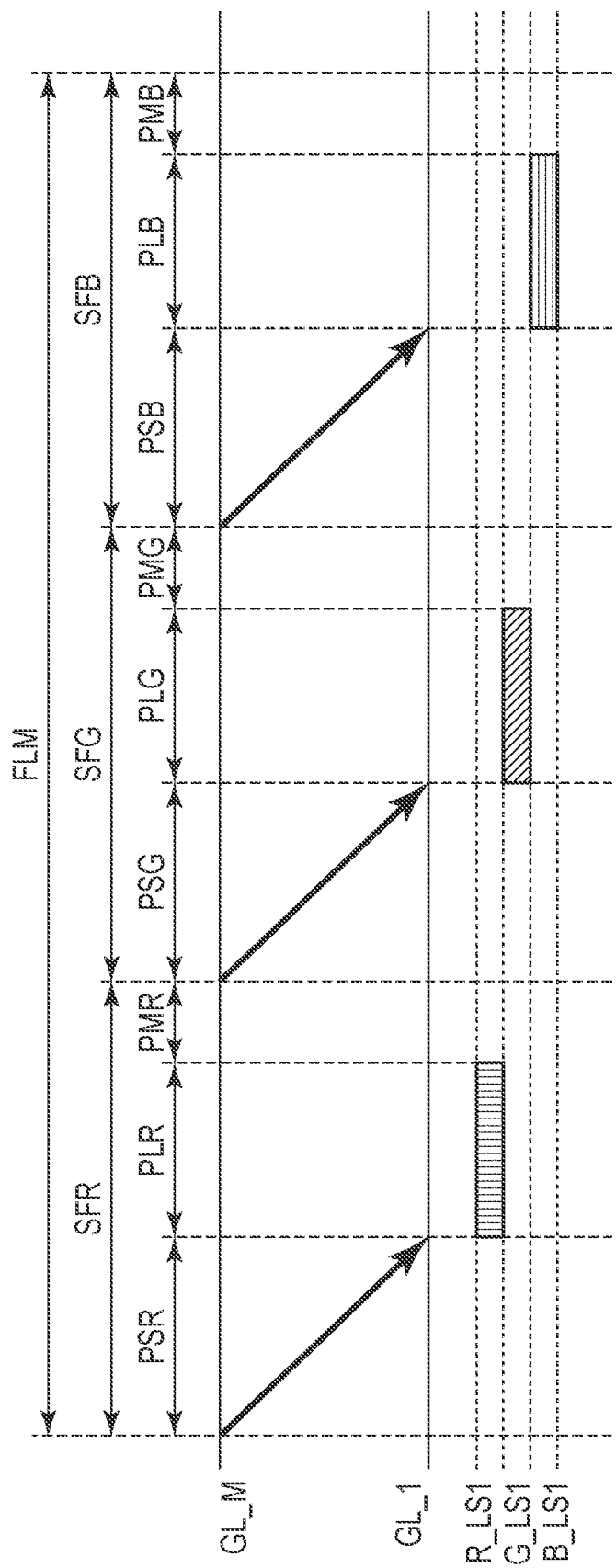
FIG. 4 illustrates a display operation of the display device.

FIG. 4 illustrates a display operation of the display device DSP. In FIG. 4, the light source element LS1 includes a red (R) light source element R_LS1, green (G) light source element G_LS1, and blue (B) light source element B_LS1. As described above, in the display operation of the display device DSP, one frame period FLM includes a plurality of sub frame periods SFL. Specifically, one frame period FLM includes subframe periods SFR, SFG, and SF which are red, green, and blue subframe periods, respectively.

First, the red subframe period SFR will be explained. In the display operation of the display device DSP of FIG. 4, the light source element LS1, in this example, the scan line GL_M closest to the red light source element R_LS1 becomes an on state, and scanning sequentially proceeds to the scan line GL_1 which is most distant from the light source element R_LS1. In other words, the pixels PX are scanned from the light entrance part side to the opposed light entrance part side. Furthermore, the image signal is input to the pixel PX from the signal line SL.

In the period PSR in the subframe period SFR, after the pixels PX are scanned from the light entrance part side to the opposed light entrance part side, the light source element LS1 is turned on in the period PLR. The light emitted from the light source element LS1 which has been turned on is incident on the display area DA. Note that, the period PSR may be referred to as scan period, and the period PLR may be referred to as on period.

If the image signal is input to the pixel PX in the on state, a voltage is applied to the liquid crystal layer LC, and the alignment of the liquid crystal molecules LCM changes based on the produced field.

Here, since the liquid crystal molecules LCM are scattered in the gaps between the polymers PLM, a period between the application of the voltage and the change of the alignment direction of the liquid crystal molecules LCM becomes longer. Specifically, in the pixel PX (opposed light entrance side) connected to the scan line GL_1 which is most distant from the light source element LS1 (light source element R_LS1), the light source element R_LS1 is turned on immediately after the voltage is applied to the liquid crystal molecules LCM, and thus, the incident light reaches the pixel PX before the alignment direction of the liquid crystal molecules LCM completely changes. Thus, the incident light may not be scattered completely, and the brightness of the display image may be lowered such that the image would possibly be darkened.

On the other hand, in the pixel PX (light entrance side) connected to the scan line GL_m which is closest to the light source element LS1 (light source element R_LS1), the alignment direction of the liquid crystal molecules LCM changes in a period between the application of the voltage to the liquid crystal molecules LCM and the end of scanning of the scan line GL_1. Since the incident light reaches after the alignment direction of the liquid crystal molecules LCM completely changes, the brightness of the displayed image is high, and the image is bright.

At that time, if the image displayed on the entirety of the display area DA is displayed white, while the incident light may be weakened as described above, the maximum tone (maximum gradation) is displayed in the entirety of the display area DA, and thus, a difference between the brightness in the light entrance side and the brightness in the opposed light entrance side is relatively small. Furthermore, if the image displayed is displayed black, the alignment direction of the liquid crystal molecules LSM does not change and no incident light is required.

However, if the image displayed is halftone (half-gradation), since the brightness of the light entrance side is high and the brightness of the opposed light entrance side is low, a bias of the brightness of the image is significant, and the display quality may possibly be deteriorated.

Thus, in the present embodiment, the scan direction in which the scan line GL is scanned is from the opposed light entrance side to the light entrance side. In other words, the pixels PX sequentially become the on state from the opposed light entrance side to the light entrance side. In this display operation, in the opposed light entrance side, the change of the alignment state of the liquid crystal molecules LCM ends in a period between turning on of the pixel PX and the reaching of the incident light from the light source element R_LS1. In the light entrance side, a period between the turning on of the pixel PX and the reaching of the incident light from the light source element R_LS1 becomes short while the incident light in the light entrance side is originally high. Thus, even if the incident light reaches before the change of the alignment state of the liquid crystal molecules LCM completely ends, the amount of light scattered is sufficient. Thus, a difference between the brightness in the light entrance side and the brightness in the opposed light entrance becomes low.

Thus, a bias of the brightness in the displayed image is improved, and the display quality can be improved.

Specific example will further be explained. A case where pixel PX (a, i) and pixel PX (b, i) are disposed in the display area DA along the second direction Y as in FIG. 1A will be considered. The pixel PX (a, i) is electrically connected to the scan line GL_a and the signal line SL_i. The pixel PX (b, i) is electrically connected to the scan line GL_b and the signal line SL_i. The scan line GL_b is closer to the light source element LS1 than is the scan line GL_a. That is, the pixel PX (b, i) is closer to the light source element LS1 than is the pixel PX (a, i).

As described above, the light from the light source element LS1 is incident on the display area DA along the incident direction LID which is the same as the second direction Y. Furthermore, the scan direction SCN is from the opposed light entrance side to the light entrance side, that is, in FIG. 1A, is the opposite direction of the second direction Y. Thus, the pixel PX (a, i) which is distant from the light source element LS1 and the pixel PX (b, i) closer to the light source element LS1 become the on state in this order.

Note that, the pixel PX (a, i) and the pixel PX (b, i) are connected to the same signal line SL_i; however, no limitation is intended thereby. Two pixels PX may be connected different signal lines SL.

Figure 5:
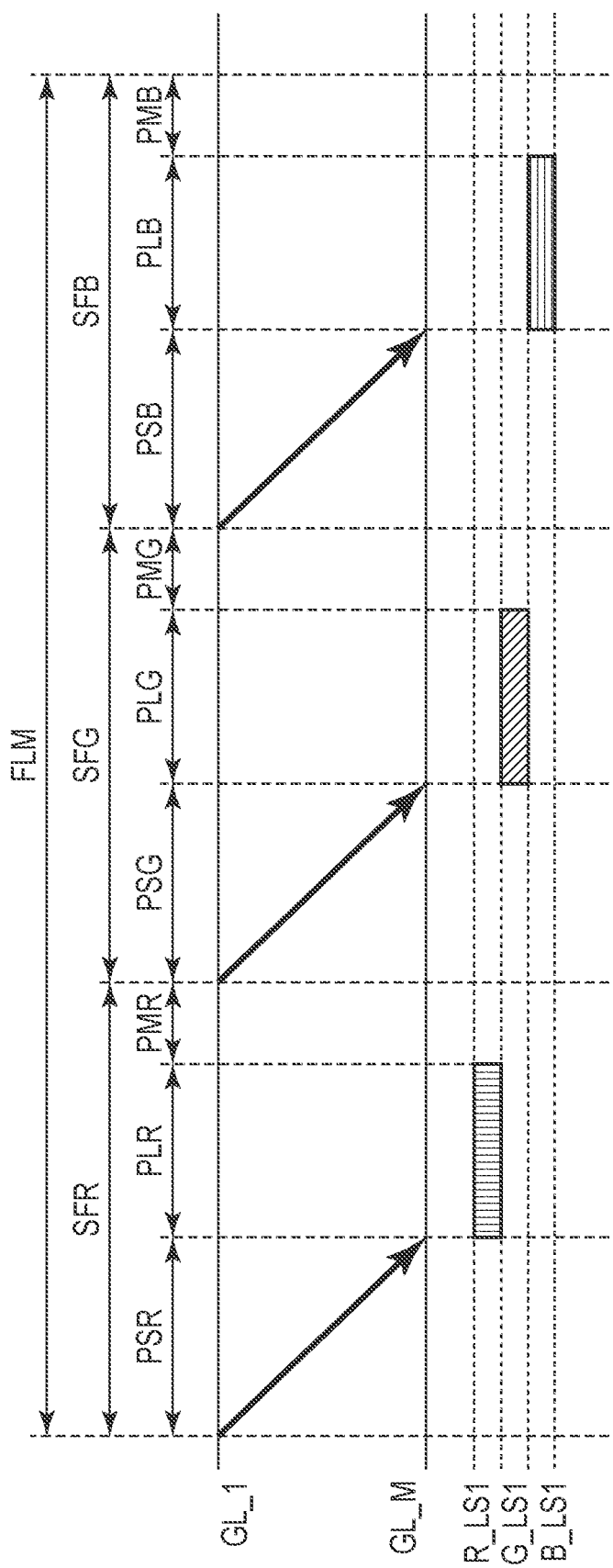
FIG. 5 illustrates the display operation of the display device.

FIG. 5 illustrates the display operation of the display device DSP. As in FIG. 4, the red subframe period SFR will be explained first. In the display device DSP of FIG. 5, the light source element LS1, in this example, the scan line GL_1 which is most distant from the red light source element R_LS1 becomes an on state, and the scanning is performed sequentially to the scan line GL_M which is closest to the light source element R_LS1. In other words, the pixels PX are scanned from the opposed light entrance part side to the light entrance part side. Note that the image signal from the signal line SL is input to the pixel PX.

In the period PSR in the subframe period SFR, after the pixels PX are scanned from the opposed light entrance part side to the light entrance part side, light is emitted from the light source element R_LS1 in the period PLR.

When the image signal is input to the pixel PX, a voltage is applied to the liquid crystal layer LC, and the alignment of the liquid crystal molecules LCM is changed based on the produced field.

As described above, in the display operation of FIG. 5, the direction from the scan line GL_1 in the opposed light entrance part side to the scan line GL_M in the light entrance part side is the scan direction SCN. In FIG. 5, the scan direction SCN is the opposite direction of the second direction Y. That is, the scan direction SCN is the opposite direction of the incident direction LID of the incident light on the display area DA from the light source element R_LS1. The change of the alignment direction of the liquid crystal molecules LSM ends while the incident light reaches the pixel PX, and thus, the decrease of the brightness is suppressed even in the opposed light entrance part side, and a bias in the brightness of the entire display area DA can be solved.

When the period PLR ends, the subframe period SFR ends through a period PMR which is a reset period. In the reset period PMR, the scanning of the pixels PX and light emission of the light source element R_LS1 are not performed. The resent period PMR is a period in which the changed alignment direction of the liquid crystal molecules LSM returns to the initial state of the subframe period.

Secondly, the green subframe period SFG starts. The subframe period SFG includes a period PSG which is a scan period, period PL which is a light period, and reset period PMG. In the period PSG of the subframe period SFG, the scan line GL_1 in the opposed light entrance part side becomes an on state, and the scanning is sequentially performed to the scan line GL_M in the light entrance part side. That is, the scan direction SCN is the same as the period PSR. When the period PSR ends, light is emitted from the light source element G_LS1 in the period PLG in the light period. Then, the subframe period SFG ends through the period PMG which is the reset period.

After the green subframe period SFG, the blue subframe period SFB starts. The subframe period SFB includes a period PSB which is a scan period, period PLB which is a light period, and reset period PMB. In the blue subframe period SFB, the same operation performed in the subframe periods SFR and SFG is performed. Note that, in the period PLB which is a light period in the blue subframe period SFB, the blue light source element B_LS1 emits light.

By repeating the frame period FLM including the subframe periods SFR, SFG, and SFB, the display operation of the display device DSP is performed.

In the display device DSP of the present embodiment, the scan direction SCN of the pixels PX, and the incident direction LID of the light source element LS1 are reversed, and thus, a different between the brightness in the light entrance part side and the brightness in the opposed light entrance part side can be reduced. Thus, a bias in the brightness in the displayed image can be improved, and the display device which can increase the display quality can be achieved.

Structure Example 1

Figure 6:
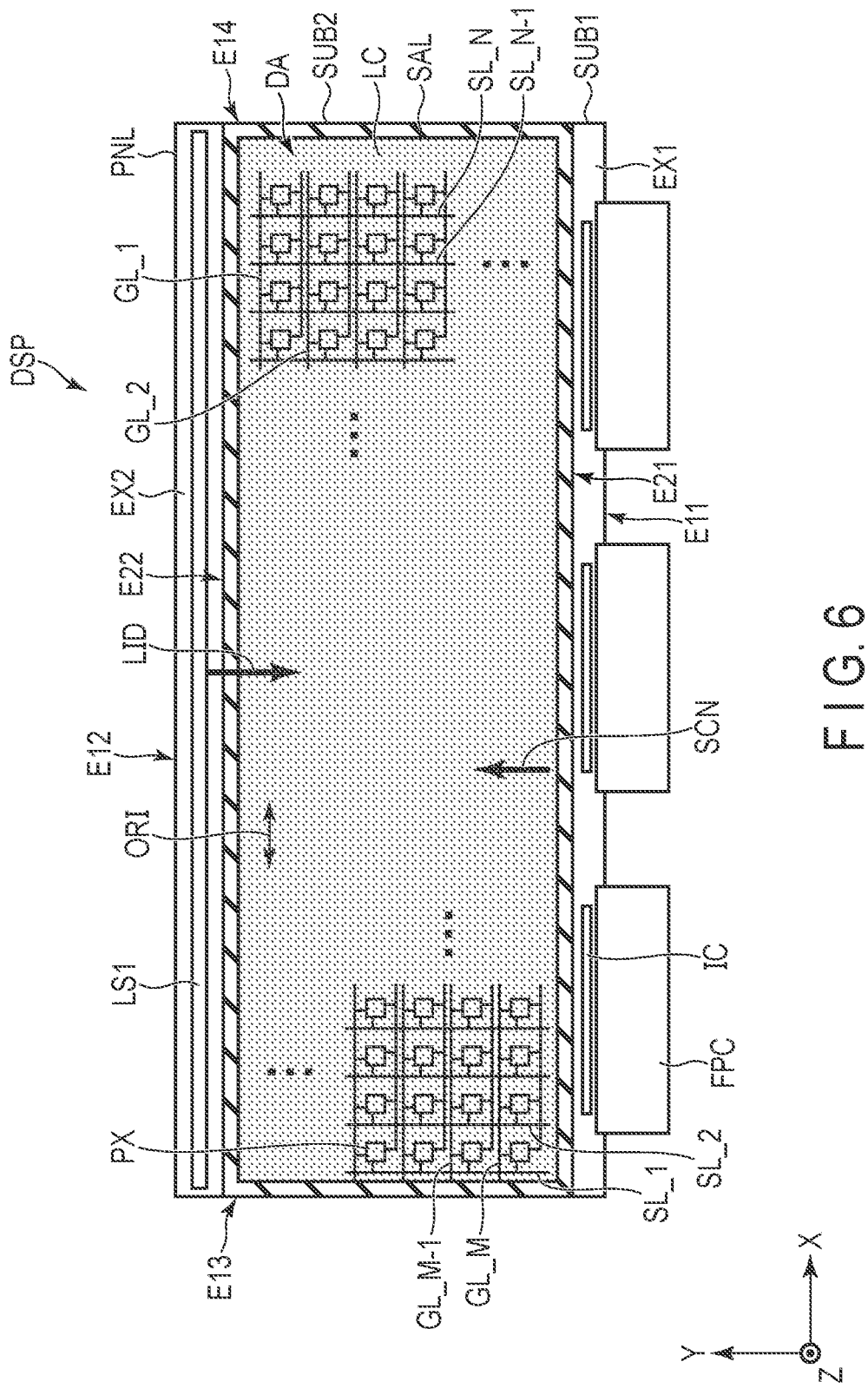
FIG. 6 is a plan view of another example of the structure of the display device of the embodiment.

FIG. 6 is a plan view of an example of the structure of the display device of the embodiment. In the example of the structure of FIG. 6, as compared to the example of FIGS. 1A to 1C, the light source element is disposed in an extension which is in the opposite side of the extension where the line substrate and the circuit element are disposed.

The display panel PNL of the display device DSP of FIG. 6 includes a side surface E12 as with the example of FIGS. 1A to 1C. Furthermore, in the display panel PNL, a second substrate SUB2 includes a side surface E22 extending in the first direction X. The side surface E22 is a side surface formed along the long side of the substrate SUB2.

The substrate SUB1 includes an extension Ex2 which is a part not overlapping the substrate SUB2. The extension Ex2 is the part of the substrate SUB1 extending in the second direction Y from the side surface E12, and corresponds to an area between the side surface E12 of the substrate SUB1 and the side surface E22 of the substrate SUB2.

The light source element LS1 of FIG. 6 is disposed on the extension Ex2. Light from the light source element LS1 is incident on the display area DA from the side surface E22 which is the light entrance part along the opposite direction of the second direction Y. That is, the incident direction LID of the incident light from the light source element LS1 is opposite to the second direction Y. In the display device DSP of FIG. 6, the side surface E12 and E22 are the opposed light entrance parts. The incident light from the light source element LS1 propagates along the incident direction LID from the light entrance part side (side surface E22 side) to the opposed light entrance part side (side surface E21 side).

In the display device DSP of FIG. 6, the scan line GL_M which is most distant from the light source element LS1 initially becomes an on state, and the scanning is sequentially performed to the scan line GL_1 which is closest to the light source element LS1. That is, the scan direction SCN of the pixels PX is the same as the second direction Y. The pixels PX sequentially become the on state along the scan direction SCN which is along the incident direction LID from the opposed light entrance part side (side surface E21 side) to the light entrance part side (side surface E22 side). The display operation of the pixels PX of FIG. 6 is the same as that of FIG. 4, and thus, the detailed description is omitted here.

In the display device DSP of FIG. 6, the alignment direction ORI in which the polymer PLM of the liquid crystal layer LC extends linearly is, as in FIGS. 1A to 1C, parallel to the first direction X. The incident direction LID is opposite to the second direction Y, and the scan direction SCN is the same as the second direction Y. Thus, a bias in the brightness of the displayed image is solved, and the display quality can be increased.

Structural Example 2

Figure 7:
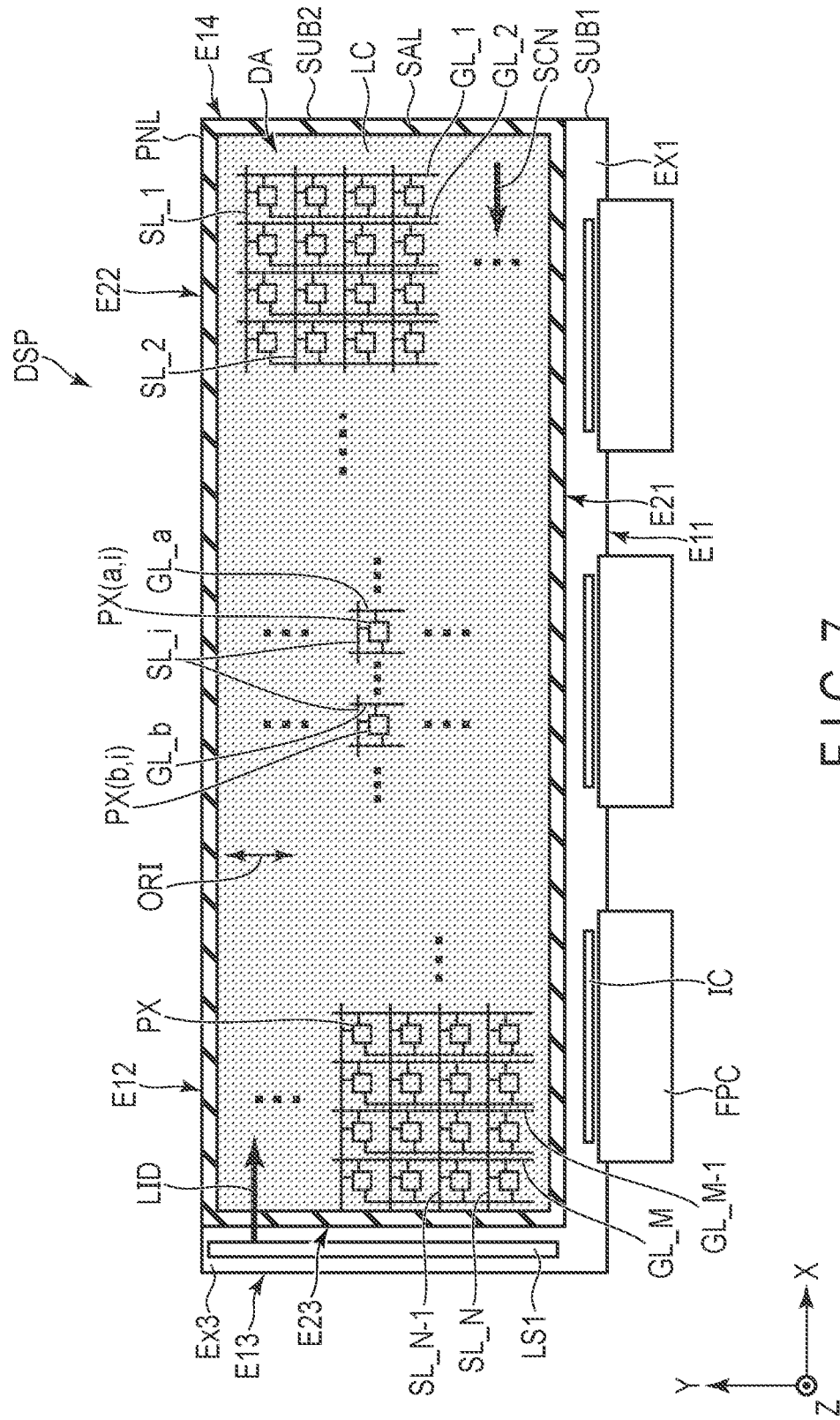
FIG. 7 is a plan view of another example of the structure of the display device of the embodiment.

FIG. 7 is a plan view of another example of the structure of the display device of the embodiment. The example of FIG. 7 includes, as compared to the example of FIGS. 1A to 1C, a light source element disposed in an extension in a short side of a display panel.

The display panel PNL of the display device DSP of FIG. 7 includes a side surface E13 as with FIG. 1A. Furthermore, in the display panel PNL, a second substrate SUB2 includes a side surface E23 extending in the second direction Y. The side surface E23 is a side surface formed along the short side of the substrate SUB2. The side surfaces E13 and E23 are side surfaces which are parallel to each other and are opposed to each other.

The substrate SUB1 includes an extension Ex3 which is a part not overlapping the substrate SUB2. The extension Ex3 is a part of the substrate SUB1 extending from the side surface E13 in the first direction X, and corresponds to an area between the side surface E13 of the substrate SUB1 and the side surface E23 of the substrate SUB2.

The light source element LS1 of FIG. 7 is disposed in the extension Ex3. When the light source element LS1 emits light, the light is incident on the display area DA from the side surface E23 as the light entrance part along the first direction X. That is, the incident direction LID of the incident light from the light source element LS1 is the first direction X. In the display device DSP of FIG. 7, the side surface E14 opposed to the side surface E23 is the opposed light entrance part. The incident light from the light source element LS1 propagates along the incident direction LID from the light entrance part side (side surface E23 side) to the opposed light entrance part side (side surface E14 side).

In the display device DSP of FIG. 7, the polymer PLM of the liquid crystal layer LC is formed linearly extending in the second direction Y, and the liquid crystal molecules LCM are aligned such that the major axis thereof is along the second direction Y. As described above, the direction in which the polymer PLM extends is the same as the alignment direction ORI of the alignment films AL1 and AL2. Thus, the alignment direction ORI is parallel to the second direction Y.

In the display area DA, the scan lines GL each extend in the opposite direction of the second direction Y, and are arranged in the opposite direction of the first direction X at intervals. The signal lines SL each extend in the opposite direction of the first direction X, and are arranged in the opposite direction of the second direction Y at intervals.

In the display device DSP of FIG. 7, as with the display device DSP of FIG. 1A, the scan signal is scanned from the scan line GL_1 which is most distant from the light source element LS1 to the scan line GL_M which is closest to the light source element LS1. In other words, the scan direction SCN in which the pixels PX sequentially become an on state is the opposite direction of the first direction X.

As with FIGS. 1A to 1C, specific example will further be explained. As in FIG. 7, a case where pixel PX (a, i) and pixel PX (b, i) are provided with the display area DA along the opposite direction to the first direction X will be considered. The pixel PX (a, i) is electrically connected to the scan line GL_1 and the signal line SL_i. The pixel PX (b, i) is electrically connected to the scan line GL_b and the signal line SL_i. The scan line GL_b is closer to the light source element LS1 than is the scan line GL_a. That is, the pixel PX (b, i) is closer to the light source element LS1 than is the pixel PX (a, i).

As described above, light from the light source element LS1 is incident on the display area DA along the incident direction LID which is the same as the first direction X. Furthermore, the scan direction SCN is from the opposed light entrance side to the light entrance side, that is, in FIG. 7, the opposite direction of the first direction X. Thus, the pixel PX (a, i) which is distant from the light source element LS1 to the pixel PX (b, i) which is closer to the light source element LS1 sequentially become the on state.

Note that the pixels PX (a, i) and the pixel PX (b, i) are pixels connected to the same signal line SL_i; however, they are not limited thereto. These two pixels PX may be connected to different signal lines SL.

In the display device DSP of FIG. 7, the alignment direction ORI which is the direction in which the polymer PLM of the liquid crystal layer LC extends linearly is the direction parallel to the second direction Y. The incident direction LID is the first direction X, and the scan direction SCN is the opposite direction to the first direction X. Thus, a bias in the brightness of the displayed image is solved, and the display quality can be increased.

Figure 8:
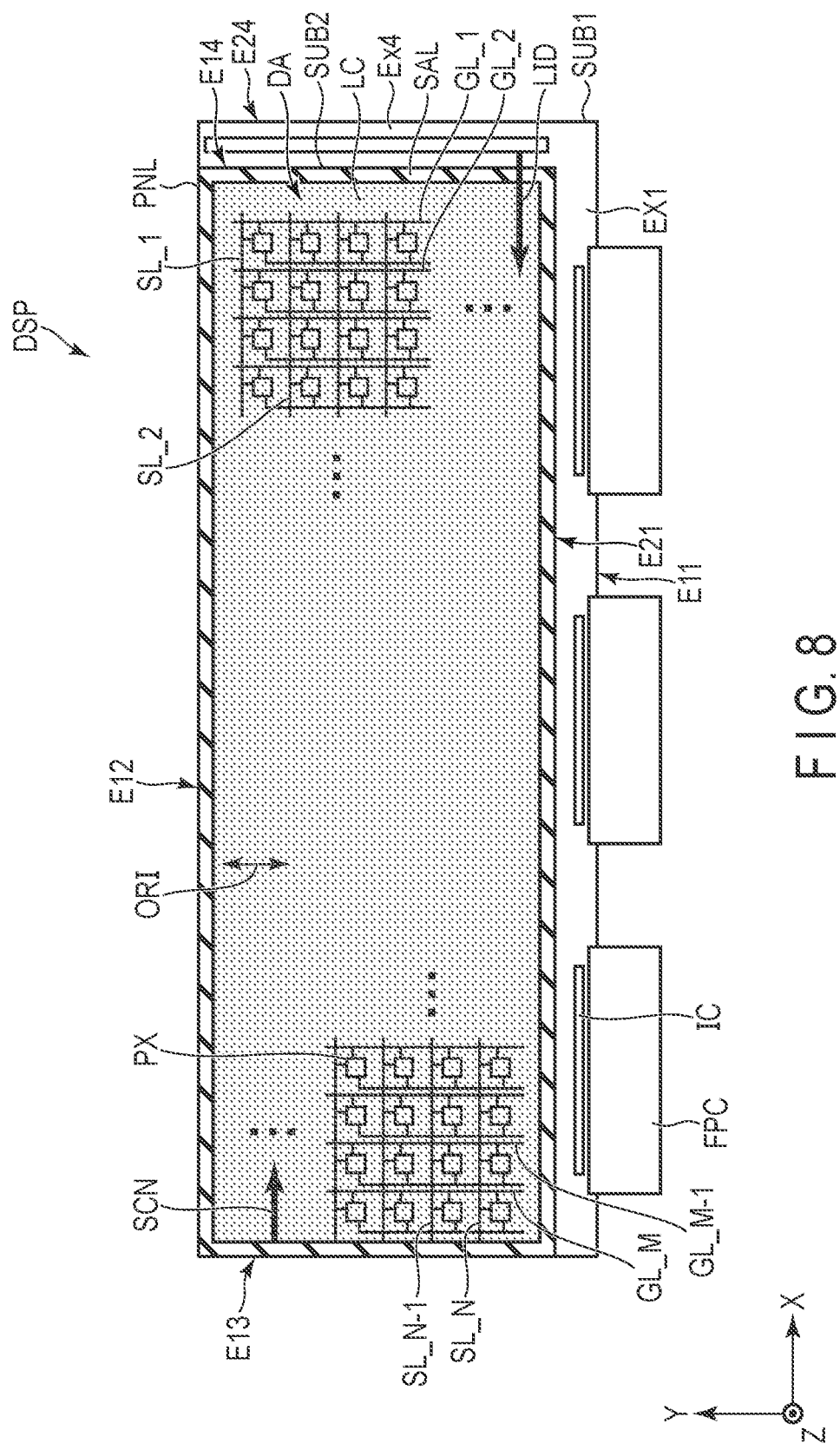
FIG. 8 is a plan view of another example of the structure of the display device of the embodiment.

FIG. 8 is a plan view of another example of the structure of the display device of the embodiment. In the example of FIG. 8, as compared to the example of FIG. 7, the light source element LS1 is disposed in the side surface E14 side.

The display panel PNL of the display device DSP of FIG. 8 includes a side surface E14 as with FIG. 1A. Furthermore, in the display panel PNL, the second substrate SUB2 includes a side surface E24 extending in the second direction Y. The side surface E24 is the side surface formed along the short side of the substrate SUB2. The side surfaces E13 and E24 are parallel to each other, and are opposed to each other.

The substrate SUB1 includes an extension Ex4 which is a part not overlapping the substrate SUB2. The extension Ex4 is a part of the substrate SUB1 extending from the side surface E14 in the first direction X, and corresponds to an area between the side surface E14 of the substrate SUB1 and the side surface E24 of the substrate SUB2.

The light source element LS1 of FIG. 8 is disposed in the extension Ex4. When the light source element LS1 emits light, the light is incident on the display area DA from the side surface E24 as the light entrance part along the opposite direction of the first direction X. That is, the incident direction LID of the incident light from the light source element LS1 is the opposite direction of the first direction X. In the display device DSP of FIG. 8, the side surface E13 opposed to the side surface E24 is the opposed light entrance part. The incident light from the light source element LS1 propagates along the incident direction LID from the light entrance part side (side surface E24 side) to the opposed light entrance part side (side surface E13 side).

In the display device DSP of FIG. 8, the scan line GL_M which is most distant from the light source element LS1 initially becomes an on state, and the scanning is sequentially performed to the scan line GL_1 which is closest to the light source element LS1. That is, the scan direction SCN of the pixels PX is the same as the first direction X. The pixels PX sequentially become the on state along the scan direction SCN which is opposite to the incident direction LID from the opposed light entrance part side (side surface E13 side) to the light entrance part side (side surface E24 side). The display operation of the pixels PX of FIG. 8 is the same as that of FIG. 4, and thus, the detailed description is omitted here.

In the display device DSP of FIG. 8, the alignment direction ORI in which the polymer PLM of the liquid crystal layer LC extends linearly is parallel to the second direction Y. The incident direction LID is opposite to the second direction Y, and the scan direction SCN is the first direction X. Thus, a bias in the brightness of the displayed image is solved, and the display quality can be increased.

Structural Example 3

Figure 9:
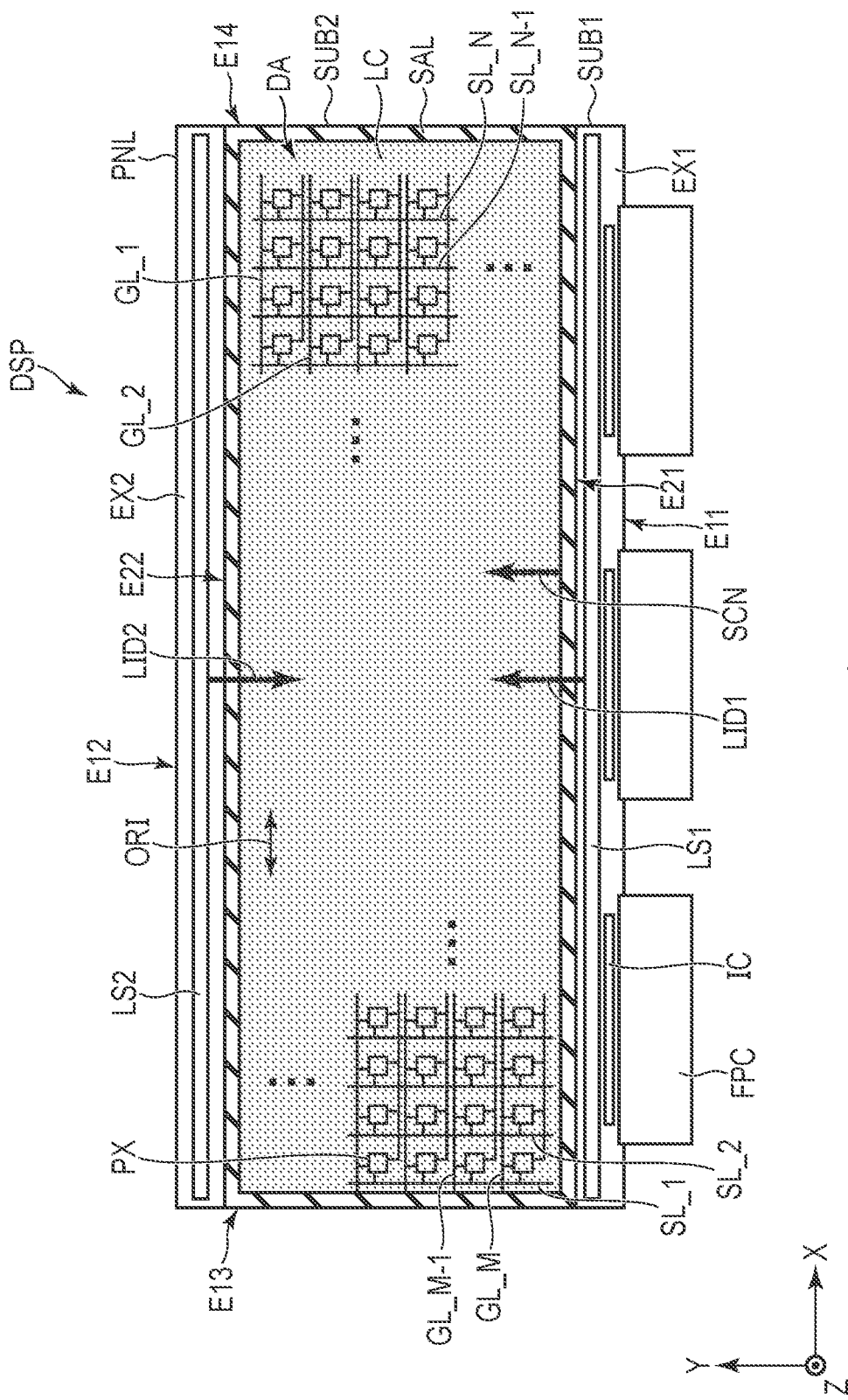
FIG. 9 is a plan view of another example of the structure of the display device of the embodiment.

FIG. 9 is a plan view of another example of the structure of the display device of the embodiment. The example of FIG. 9 includes, as compared to the example of FIGS. 1A to 1C, light source elements disposed in two extensions which are opposed to each other.

The display device DSP of FIG. 9 includes extensions Ex1 and Ex2 opposed to each other along the second direction Y. The extensions Ex1 and Ex2 are formed as described above, and the detailed description thereof is omitted here.

Light source elements LS1 and LS2 are disposed on the extensions Ex1 and Ex2, respectively. That is, in the display device DSP, light source elements are disposed on both extensions in two long sides. Note that, if there is no need of distinguishing the light source elements LS1 and LS2 from each other, it will be referred to as the light source element LS.

In the light source element LS1, the side surface E21 is the light entrance part, and the side surface E22 is the opposed light entrance part. A direction in which the light from the light source element LS1 is incident on the display area DA will be an incident direction LID1. Furthermore, in the light source element LS2, the side surface E22 is the light entrance part, and the side surface E21 is the opposed light entrance part. A direction in which the light from the light source element LS2 is incident on the display area DA will be an incident direction LID2. The incident direction LID1 is the same as the second direction Y, and the incident direction LID2 is opposite to the second direction Y.

Here, a case where the brightness of the light source element LS2 is higher than the brightness of the light source element LS1 will be considered. In the display device DSP of FIG. 9, the scan line GL_M which is most distant from the light source element LS2 initially becomes an on state, and the scanning is sequentially performed to the scan line GL_1 which is closest to the light source element LS2. That is, the scan direction SCN of the pixels PX is the opposite direction of the incident direction LID2 of the light source element LS2 of higher brightness, that is, the same as the second direction Y. Note that the display operation of the display device DSP of FIG. 9 is the same as FIG. 4.

That is, in the example of FIG. 9, the light source element LS2 of higher brightness is prioritized than the light source element LS1 of lower brightness. The scan direction SCN of the pixel PX and the pixel PX which is initially turned on are determined based on the incident direction LID2 of the light source element LS2 of higher brightness and a positional relationship with respect to the light source element LS2.

Note that, in the above example, the brightness of the light source element LS2 is higher than that of the light source element LS1; however, no limitation is intended thereby. The brightness of the light source element LS1 may be higher than that of the light source element LS2. In such a case, the scan line GL_1 which is most distant from the light source element LS1 initially becomes an on state, and the scanning is sequentially performed to the scan line GL_M which is closest to the light source element LS1. That is, the scan direction SCN of the pixels PX is opposite to the incident direction LID1 of the light source element LS1 of higher brightness, that is, opposite to the second direction Y.

Figure 10:
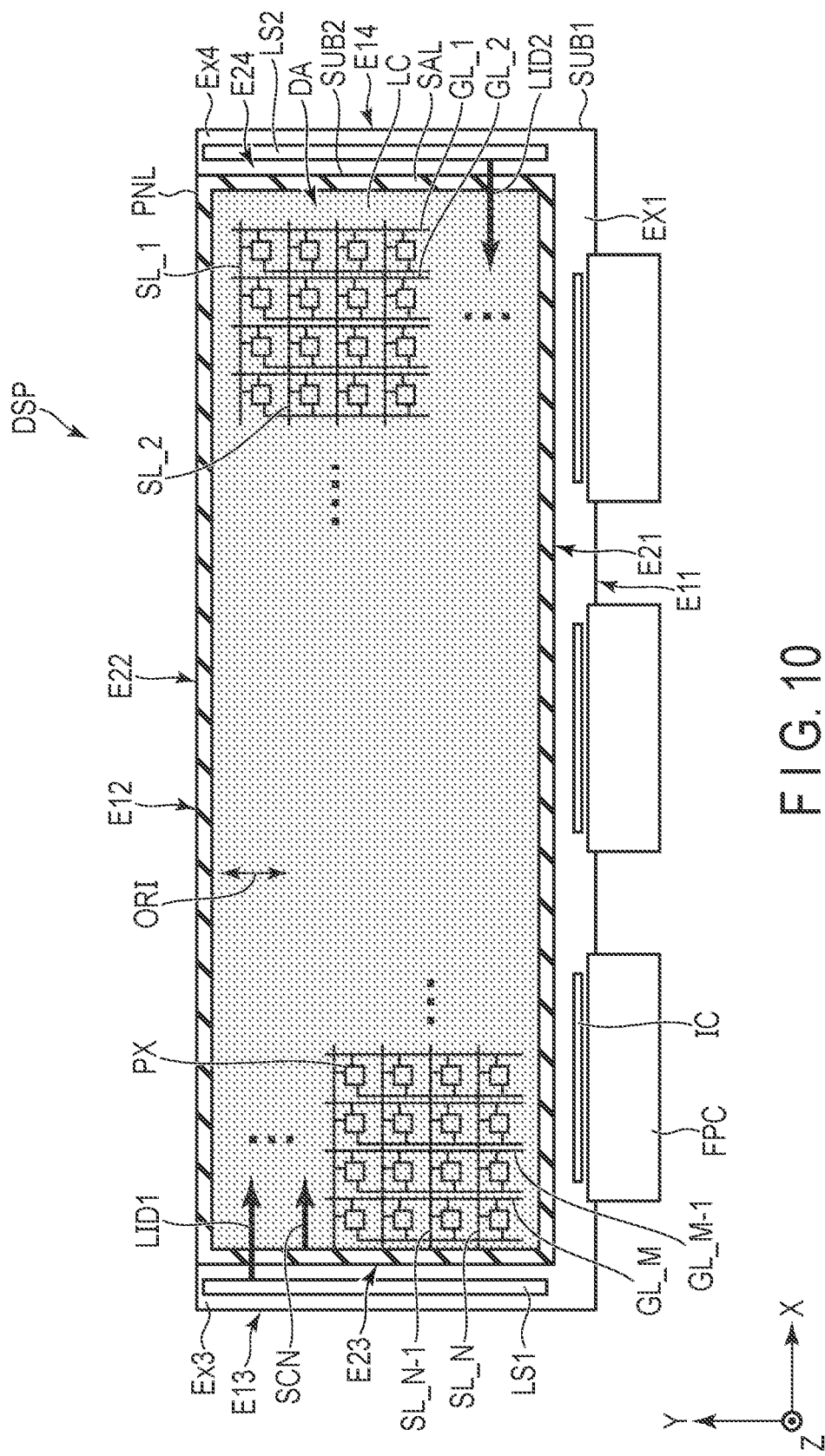
FIG. 10 is a plan view of another example of the structure of the display device of the embodiment.

FIG. 10 is a plan view of another example of the structure of the display device of the embodiment. The example of FIG. 10 includes, as compared to the example of FIG. 9, light source elements LS are disposed in both extensions of two short sides.

The display device DSP of FIG. 10 includes extensions Ex3 and Ex4 opposed to each other along the first direction X. The extensions Ex3 and Ex4 are formed as described above, and the detailed description thereof is omitted here.

Light source elements LS1 and LS2 are disposed on the extensions Ex3 and Ex4, respectively. That is, as described above, in the display device DSP, light source elements are disposed in both the extensions in the two short sides.

In the light source element LS1, the side surface E23 is the light entrance part, and the side surface E24 is the opposed light entrance part. The side surfaces E23 and E24 are parallel to each other, and are opposed to each other. A direction in which the light from the light source element LS1 is incident on the display area DA will be an incident direction LID1. Furthermore, in the light source element LS2, the side surface E24 is the light entrance part, and the side surface E23 is the opposed light entrance part. A direction in which the light from the light source element LS2 is incident on the display area DA will be an incident direction LID2. The incident direction LID1 is the same as the first direction X, and the incident direction LID2 is opposite to the first direction X.

Here, a case where the brightness of the light source element LS2 is higher than the brightness of the light source element LS1 will be considered. In the display device DSP of FIG. 10, the scan line GL_M which is most distant from the light source element LS2 initially becomes an on state, and the scanning is sequentially performed to the scan line GL_1 which is closest to the light source element LS2. That is, the scan direction SCN of the pixels PX is the opposite direction of the incident direction LID2 of the light source element LS2 of higher brightness, that is, the same as the first direction X. Note that the display operation of the display device DSP of FIG. 10 is the same as FIG. 4.

That is, in the example of FIG. 10, as with FIG. 9, the light source element LS2 of higher brightness is prioritized than the light source element LS1 of lower brightness. The scan direction SCN of the pixel PX and the pixel PX which is initially turned on are determined based on the incident direction LID2 of the light source element LS2 of higher brightness and a positional relationship with respect to the light source element LS2.

Note that, in the above example, the brightness of the light source element LS2 is higher than that of the light source element LS1; however, no limitation is intended thereby. The brightness of the light source element LS1 may be higher than that of the light source element LS2. In such a case, the scan line GL_1 which is most distant from the light source element LS1 initially becomes an on state, and the scanning is sequentially performed to the scan line GL_M which is closest to the light source element LS1. That is, the scan direction SCN of the pixels PX is opposite to the incident direction LID1 of the light source element LS1 of higher brightness, that is, opposite to the first direction X.

In the display devices DSP of FIGS. 9 and 10, two light source elements LS are disposed on two extensions opposed to each other, and the brightness of one light source element LS is higher than that of the other light source element LS. The pixels PX sequentially become the on state from the opposed light entrance part side of the light source element LS of higher brightness to the light entrance part side. Thus, a bias in the brightness of the displayed image is solved, and the display quality can be increased.

Structural Example 4

Figure 11:
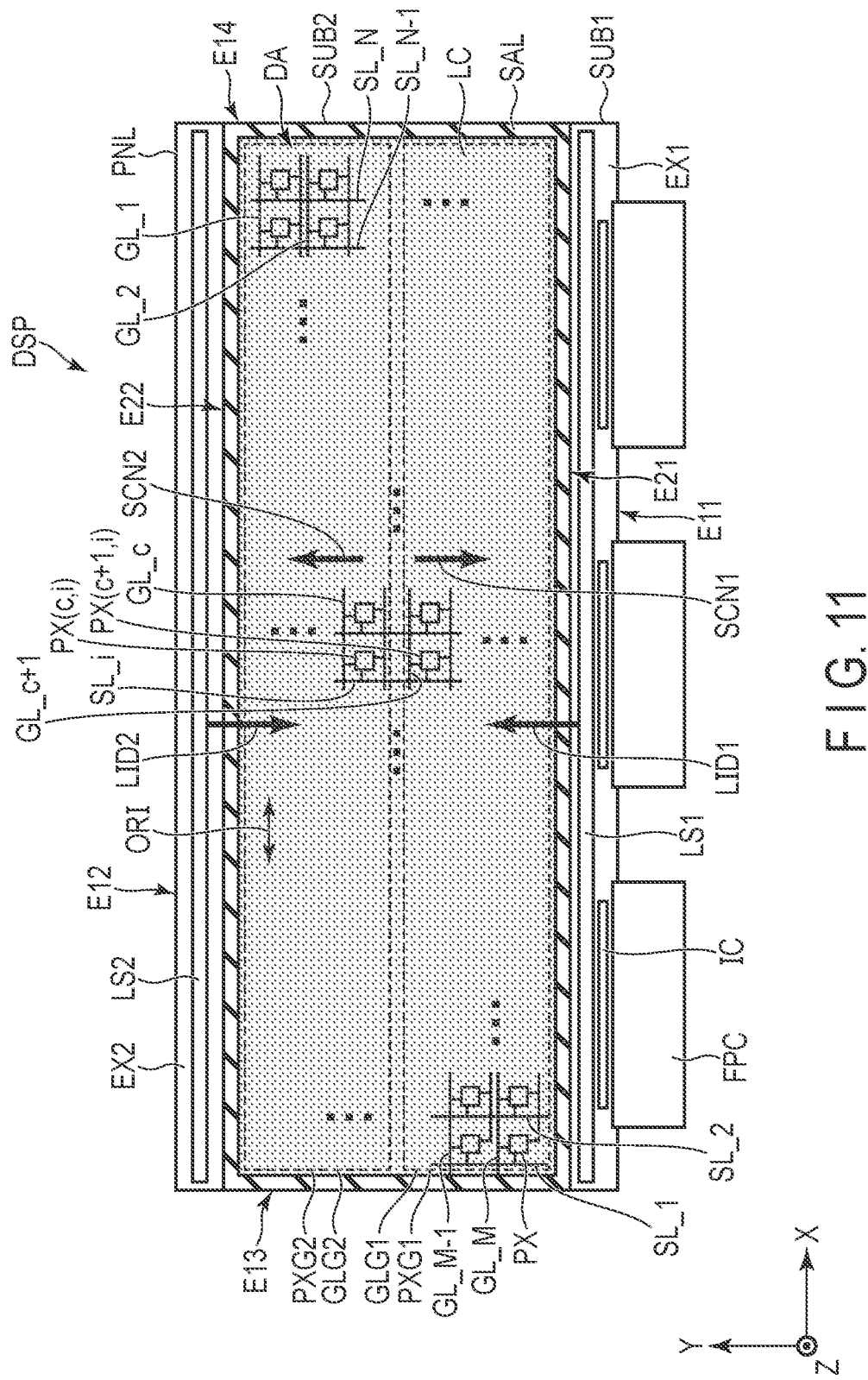
FIG. 11 is a plan view of another example of the structure of the display device of the embodiment.

FIG. 11 is a plan view of another example of the structure of the display device of the embodiment. The example of FIG. 11 includes, as compared to the example of FIG. 9, two light source elements have equal brightness.

In the display device DSP of FIG. 11, the light source elements LS1 and LS2 disposed on the extensions Ex1 and Ex2 opposed to each other have equal brightness. In that case, from the pixels PX in the center row of the display area DA, the scan signals are input to opposite directions of the incident directions LID1 and LID2.

In FIG. 11, of the scan lines GL_1 to GL_M, the scan lines GL_1 to GL_c are regarded as a second scan line group GLG2, and the scan lines GL_c+1 to GL_M are regarded as a first scan line group GLG1. In this example, c is a natural integer which is a half of M (c=M/2). That is, the number of the scan lines GL of the first scan line group GLG1 and the number of the scan lines GL of the second scan line group GLG2 are the same.

Note that, in the following description, the light source elements LS1 and LS2 are emitted at the same time after scanning all scan lines GL; however, no limitation is intended thereby. Initially, one of the first scan line group GLG1 and the second scan line group GLG2 may be scanned, and the corresponding light source element LS may be turned on, and then, the other group may be scanned, and the corresponding light source element LS may be turned on. For example, the first scan line group (scan lines GL_c+1 to GL_M) may be scanned, and the light source element LS1 may be turned, and then, the second scan line group GLG2 (scan line GL_1 to GL_c) may be scanned, and the light source element LS2 may be turned.

The first scan line groups GLG1 is positioned closer to the light source element LS1 than is the second scan line group GLG2. The second scan line group GLG2 is positioned closer to the light source element LS2 than is the first scan line group GLG1.

With respect to the light source element LS1, the scan signal is initially input to the scan line GL_c+1 which is most distant from the light source element LS1 of the first scan line group GLG1 in the center row of the display area DA, and the scanning is performed to the scan line GL_M.

That is, from the pixel PX (c+1, i) electrically connected to the scan line GL_c+1 and optional signal line SL_i to the pixel PX (M, i) electrically connected to the scan line GL_M and optional signal line SL_i, the pixels sequentially become the on state.

With respect to the light source element LS2, the scan signal is initially input to the scan line GL_c which is most distant from the light source element LS2 of the second scan line group GLG2 in the center row of the display area DA, and the scanning is performed to the scan line GL_1.

That is, from the pixel PX (c, i) electrically connected to the scan line GL_c and optional signal line SL_i to the pixel PX (1, i) electrically connected to the scan line GL_1 and optional signal line SL_i, the pixels sequentially become the on state.

The scan direction from the scan line GL_c+1 to the scan line GL_M is the scan direction SCN1, and the scan direction from the scan line GL_c to the scan line GL_1 is the scan direction SCN2. The scan direction SCN1 is opposite to the second direction Y, and the direction in which the above-mentioned pixels PX (c+1, i) to (M, i) are sequentially turned on. The scan direction SCN2 is the second direction Y, and the direction in which the above-mentioned pixels PX (c, i) to (1, i) are sequentially turned on. The scan direction SCN1 is opposite to the incident direction LID1 of the light source element LS1, and the scan direction SCN2 is opposite to the incident direction LID2 of the light source element LS2.

Note that, if the pixels PX connected to the first scan line group GLG1, that is, pixels PX connected to the scan lines GL_c+1 to GL_M are a first pixel group PXG1, the first pixel group PXG1 includes pixels PX from (C+1, 1) to (M, N).

If the pixels PX connected to the second scan line group GLG2, that is, pixels PX connected to the scan lines GL_1 to GL_c are a second pixel group PXG2, the second pixel group PXG2 includes pixels PX from (1, 1) to (c, N).

The first pixel group PXG1 is closer to the light source element LS1 than is the second pixel group PXG2. The second pixel group PXG2 is closer to the light source element LS2 than is the first pixel group PXG1.

The scan direction SCN1 is the scan direction of the first pixel group PXG1, and the scan direction SCN2 is the scan direction of the second pixel group PXG2.

Figure 12:
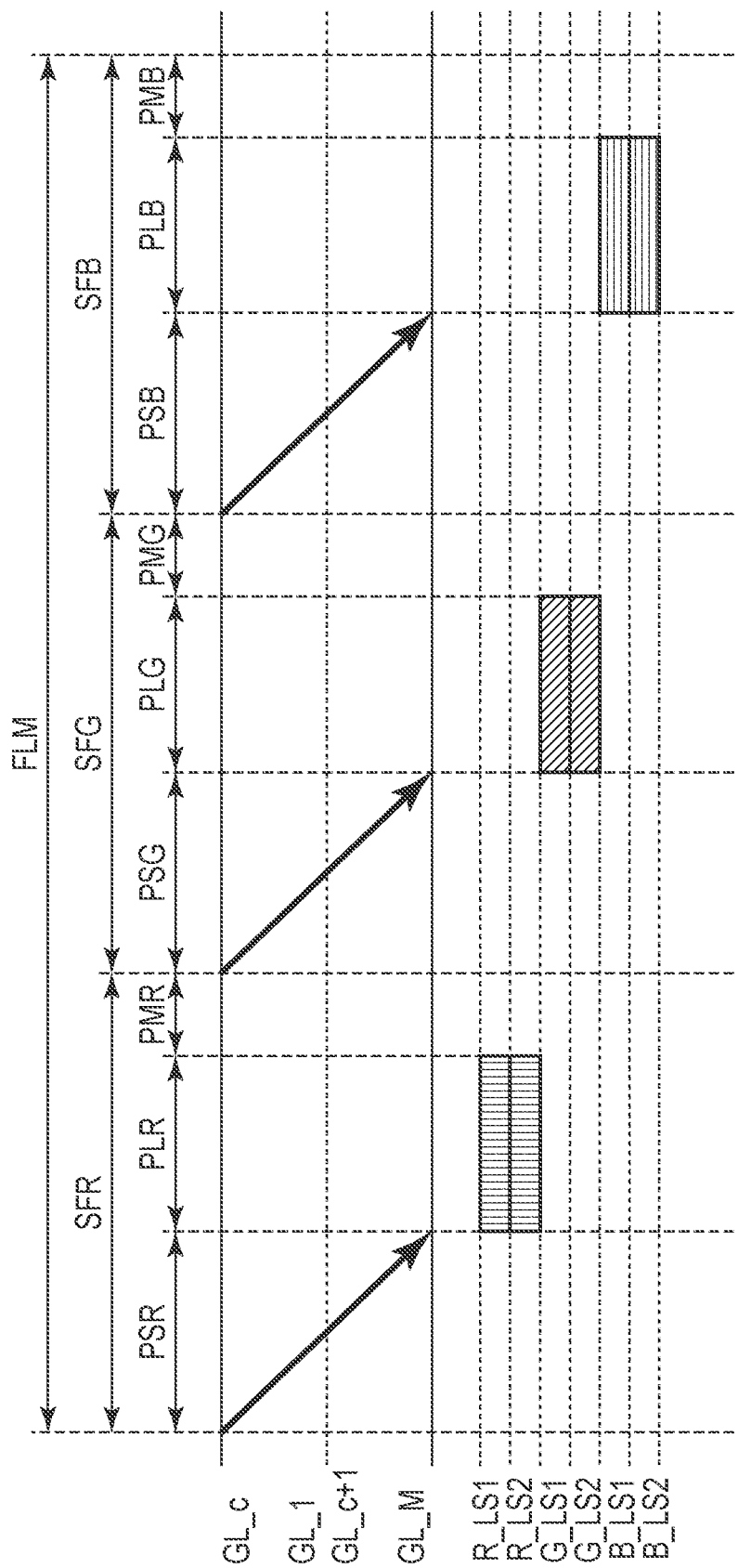
FIG. 12 illustrates a display operation of the display device of FIG. 11.

FIG. 12 illustrates a display operation of the display device DSP of FIG. 11. As in FIG. 12, in the periods PSR, PSG, and PSB, the scanning is performed from the scan lines GL_c to GL_1, and from the scan lines GL_c+1 to GL_M. After the periods PSR, PSG, and PSB, red light source elements R_LS1 and R_LS2, green light source elements G_LS1 and G_LS2, and blue light source elements B_LS1 and B_LS2 emit light, respectively.

Then, the subframe periods SFR, SFG, and SFB end through reset periods PMR, PMG, and PMB.

Figure 13:
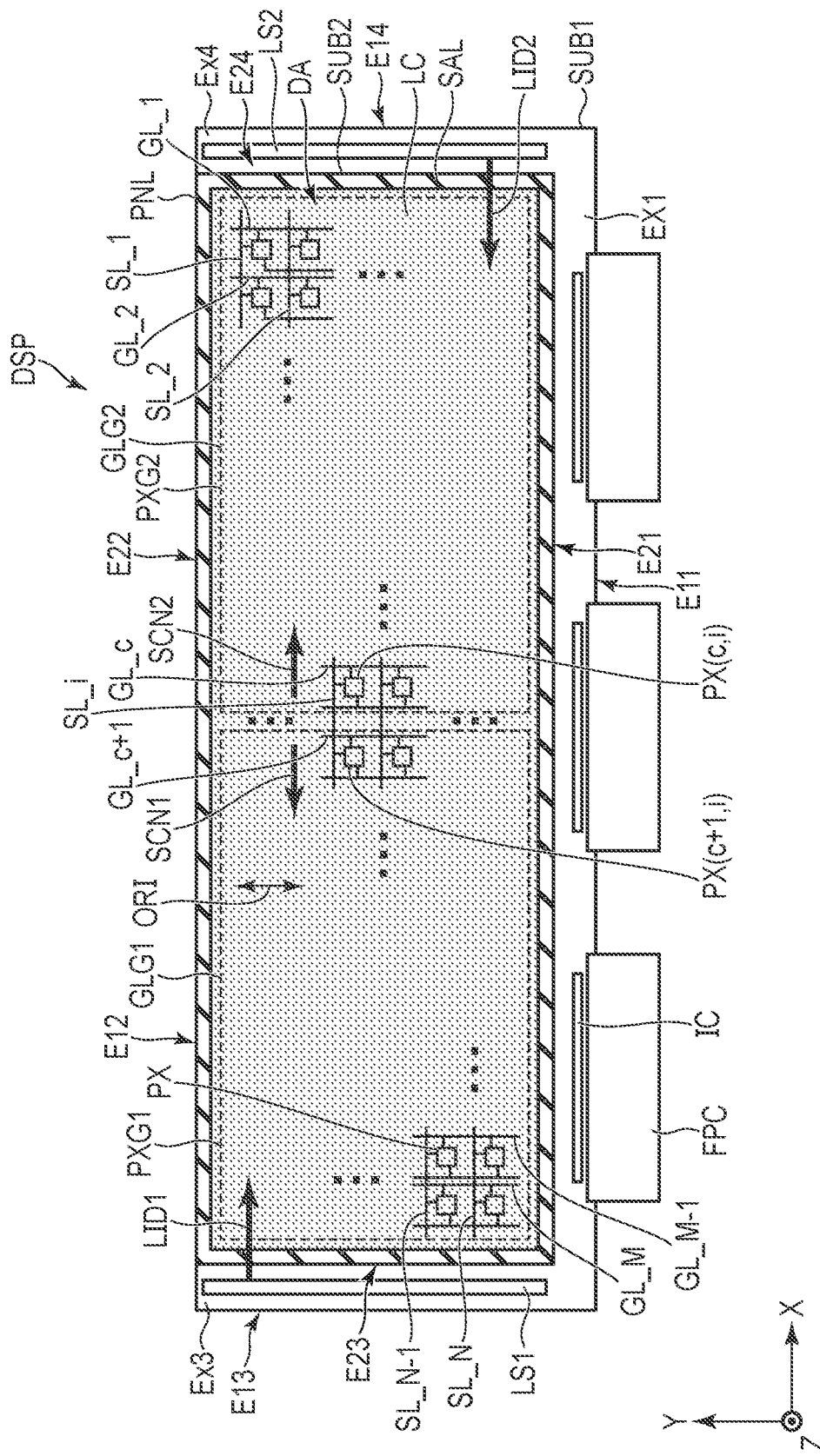
FIG. 13 is a plan view of another example of the structure of the display device of the embodiment.

FIG. 13 is a plan view of another example of the structure of the display device of the embodiment. In the example of FIG. 13, as compared to the example of FIG. 11, two light source elements are disposed on the extensions of the display panel in the short sides.

Furthermore, as compared to the display device DSP of FIG. 10, the display device DSP of FIG. 13 performs the scanning from the pixel PX positioned in the center of the display area DA to the opposite directions of the incident directions LID1 and LID2.

Note that the parts of the example of FIG. 13 which are the same as those of the example of FIG. 11 will be omitted in the following description.

In the display device DSP of FIG. 13, as with the display device DSP of FIG. 11, the scan signal is input from the scan line GL_c+1 which is most distant from the light source element LS1 of the first scan line group GLG1 in the center row of the display area DA, and the scanning is performed to the scan line GL_M.

That is, from the pixel PX (c+1, i) electrically connected to the scan line GL_c+1 and optional signal line SL_i to the pixel PX (M, i) electrically connected to the scan line GL_M and optional signal line SL_i, the pixels sequentially become the on state.

With respect to the light source element LS2, the scan signal is initially input to the scan line GL_c which is most distant from the light source element LS2 of the second scan line group GLG2 in the center row of the display area DA, and the scanning is performed to the scan line GL_1.

That is, from the pixel PX (c, i) electrically connected to the scan line GL_c and optional signal line SL_i to the pixel PX (1, i) electrically connected to the scan line GL_1 and optional signal line SL_i, the pixels sequentially become the on state.

The scan direction from the scan line GL_c+1 to the scan line GL_M is the scan direction SCN1, and the scan direction from the scan line GL_c to the scan line GL_1 is the scan direction SCN2. The scan direction SCN1 is opposite to the first direction X, and the direction in which the above-mentioned pixels PX (c+1, i) to (M, i) are sequentially turned on. The scan direction SCN2 is the first direction X, and the direction in which the above-mentioned pixels PX (c, i) to (1, i) are sequentially turned on. The scan direction SCN1 is opposite to the incident direction LID1 of the light source element LS1, and the scan direction SCN2 is opposite to the incident direction LID2 of the light source element LS2.

In the display devices DSP of FIGS. 11 and 13, two light source elements LS are disposed on two extensions opposed to each other, and the two light source elements LS have equal brightness. The pixels PX sequentially become the on state from the center of the display area DA toward the light source elements LS. Thus, a bias in the brightness of the displayed image is solved, and the display quality can be increased.

Structural Example 5

Figure 14:
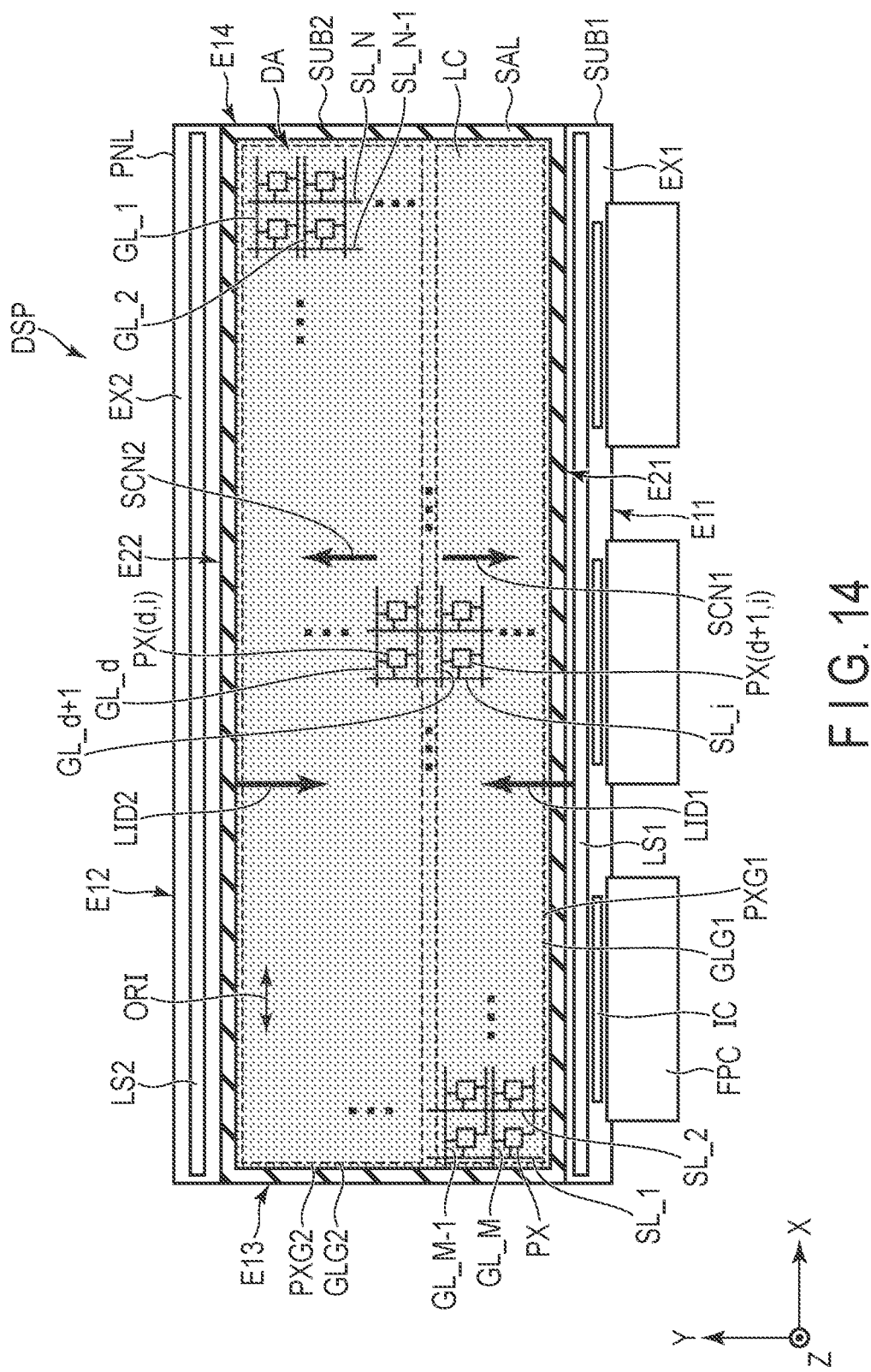
FIG. 14 is a plan view of another example of the structure of the display device of the embodiment.

FIG. 14 is a plan view of another example of the structure of the display device of the embodiment. The example of FIG. 14 includes, as compared to the example of FIG. 11, two light source elements have different brightness values, and based on a ratio of the different brightness values, a position of the scan line (pixel) where the scanning is started is determined.

In the example of FIG. 14, of the scan lines GL_1 to GL_M, the scan lines GL_1 to GL_d are regarded as a second scan line group GLG2, and the scan lines GL_d+1 to GL_M are regarded as a first scan line group GLG1. The number of scan lines GL included in the second scan line group GLG2 is d, and the number of scan lines GL included in the first scan line group GLG1 is (M−d) where d is a natural integer which is greater than 1.

The first scan line group GLG1 is positioned closer to the light source element LS1 than is the second scan line group GLG2. The second scan line group GLG2 is positioned closer to the light source element LS2 than is the first scan line group GLG1.

In the display device DSP of FIG. 14, the light source elements LS1 and LS2 disposed on the extensions Ex1 and Ex2 have different brightness. In the example of FIG. 14, the brightness LA2 of the light source element LS2 is higher than the brightness LA1 of the light source element LS1 (LA2 >LA1).

In the example of FIG. 14, the number of scan lines GL included in the first scan line group GLG1 (M−d) and the number of scan lines GL included in the second scan line group GLG2 (d) are divided based on the above ratio, and the number d is determined as LA1:LA2=(M−d):d. That is, a ratio of the brightness LA1 of the light source element LS1 and the brightness LA2 of the light source element LS2 is equal to a ratio of the number of scan lines GL included in the first scan line group GLG1 (M−d) and the number of scan lines GL included in the second scan line group GLG2 (d).

With respect to the light source element LS1, the scan signal is initially input to the scan line GL_d+1 which is most distant from the light source element LS1 of the first scan line group GLG1, and the scanning is performed to the scan line GL_M.

That is, from the pixel PX (d+1, i) electrically connected to the scan line GL_d+1 and optional signal line SL_i to the pixel PX (M, i) electrically connected to the scan line GL_M and optional signal line SL_i, the pixels sequentially become the on state.

With respect to the light source element LS2, the scan signal is initially input to the scan line GL_d which is most distant from the light source element LS2 of the second scan line group GLG2, and the scanning is performed to the scan line GL_1.

That is, from the pixel PX (d, i) electrically connected to the scan line GL_d and optional signal line SL_i to the pixel PX (1, i) electrically connected to the scan line GL_1 and optional signal line SL_i, the pixels sequentially become the on state.

The scan direction from the scan line GL_d+1 to the scan line GL_M is the scan direction SCN1, and the scan direction from the scan line GL_d to the scan line GL_1 is the scan direction SCN2. The scan direction SCN1 is opposite to the second direction Y, and the direction in which the above-mentioned pixels PX (d+1, i) to (M, i) are sequentially turned on. The scan direction SCN2 is the second direction Y, and the direction in which the above-mentioned pixels PX (d, i) to (1, i) are sequentially turned on. The scan direction SCN1 is opposite to the incident direction LID1 of the light source element LS1, and the scan direction SCN2 is opposite to the incident direction LID2 of the light source element LS2.

Note that, if the pixels PX connected to the first scan line group GLG1, that is, pixels PX connected to the scan lines GL_d+1 to GL_M are a first pixel group PXG1, the first pixel group PXG1 includes pixels PX from (d+1, 1) to (M, N).

If the pixels PX connected to the second scan line group GLG2, that is, pixels PX connected to the scan lines GL_1 to GL_d are a second pixel group PXG2, the second pixel group PXG2 includes pixels PX from (1, 1) to (d, N).

The first pixel group PXG1 is positioned closer to the light source element LS1 than is the second pixel group PXG2. The second pixel group PXG2 is positioned closer to the light source element LS2 than is the first pixel group PXG1.

The scan direction SCN1 is the scan direction of the first pixel group PXG1, and the scan direction SCN2 is the scan direction of the second pixel group PXG2.

Figure 15:
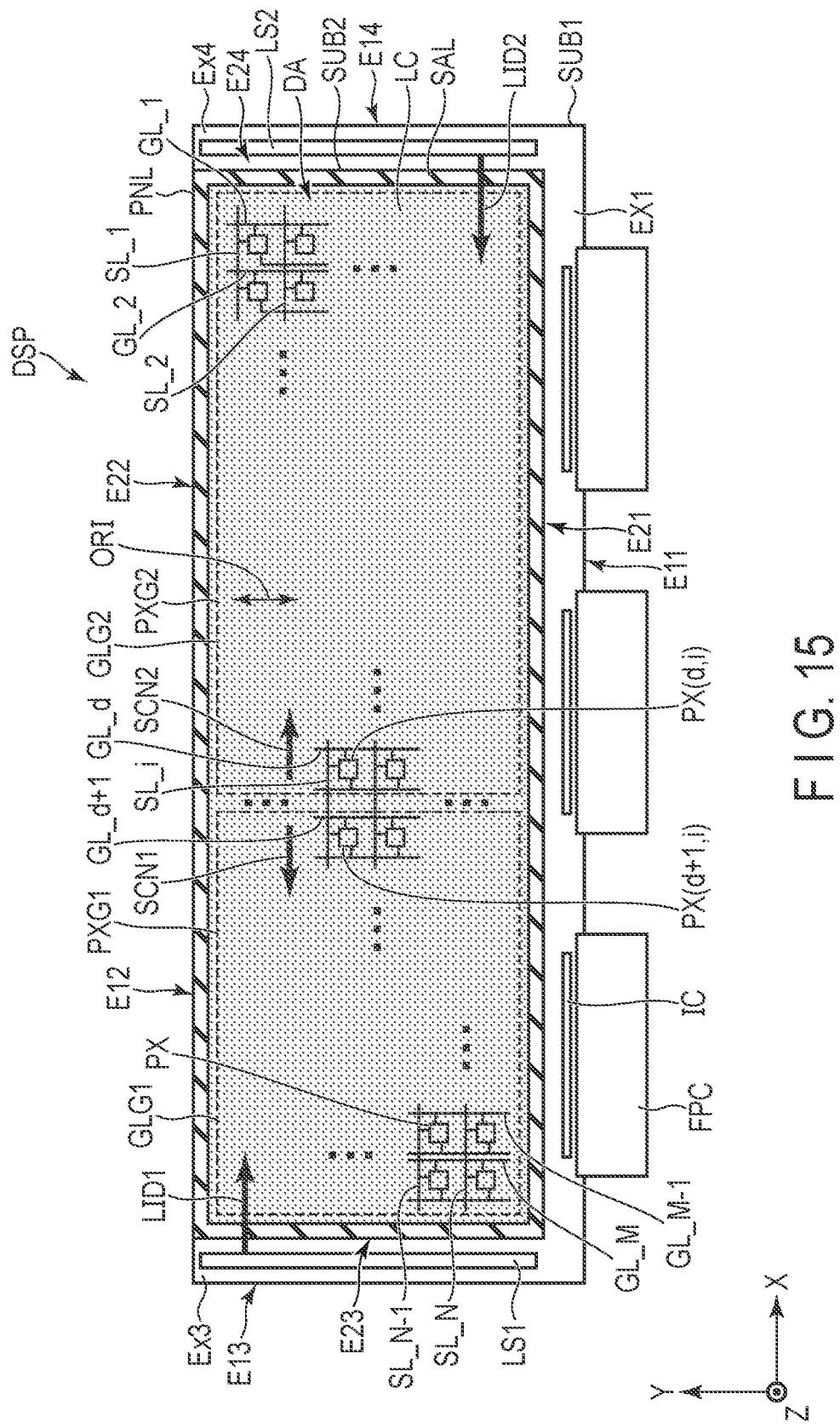
FIG. 15 is a plan view of another example of the structure of the display device of the embodiment.

FIG. 15 is a plan view of another example of the structure of the display device of the embodiment. In the example of FIG. 15, as compared to the example of FIG. 14, two light source elements are disposed on the extensions of the display panel in the short sides.

Furthermore, as compared to the display device DSP of FIG. 11, in the display device DSP of FIG. 15, the position of the scan line where the scanning is started is determined based on a ratio of the brightness values of the light source elements.

Note that the parts of the example of FIG. 15 which are the same as those of the example of FIG. 14 will be omitted in the following description.

In the display device DSP of FIG. 15, the light source elements LS1 and LS2 disposed on the extensions Ex3 and Ex4 have different brightness. In the example of FIG. 15, as with the example of FIG. 14, the brightness LA2 of the light source element LS2 is higher than the brightness LA1 of the light source element LS1.

In the example of FIG. 15, as with the example of FIG. 14, the number of scan lines GL included in the first scan line group GLG1 (M−d) and the number of scan lines GL included in the second scan line group GLG2 (d) are divided based on the above brightness ratio, and the number d is determined as LA1:LA2=(M−d):d. That is, a ratio of the brightness LA1 of the light source element LS1 and the brightness LA2 of the light source element LS2 is equal to a ratio of the number of scan lines GL included in the first scan line group GLG1 (M−d) and the number of scan lines GL included in the second scan line group GLG2 (d).

The scan direction from the scan line GL_d+1 to the scan line GL_M is the scan direction SCN1, and the scan direction from the scan line GL_d to the scan line GL_1 is the scan direction SCN2. The scan direction SCN1 is opposite to the first direction X, and the direction in which the above-mentioned pixels PX (d+1, i) to (M, i) are sequentially turned on. The scan direction SCN2 is the first direction X, and the direction in which the above-mentioned pixels PX (d, i) to (1, i) are sequentially turned on. The scan direction SCN1 is opposite to the incident direction LID1 of the light source element LS1, and the scan direction SCN2 is opposite to the incident direction LID2 of the light source element LS2.

In the display devices DSP of FIGS. 14 and 15, two light source elements LS are disposed on two extensions opposed to each other, and the two light source elements LS have different brightness. The position of the scan line (pixel) where the scanning is started is determined based on the ratio of the brightness values of the two light source elements LS. The scan lines (pixels) sequentially become the on state from the positioned scan line toward the light source elements LS. Thus, a bias in the brightness of the displayed image is solved, and the display quality can be increased.

Structural Example 6

Figure 16:
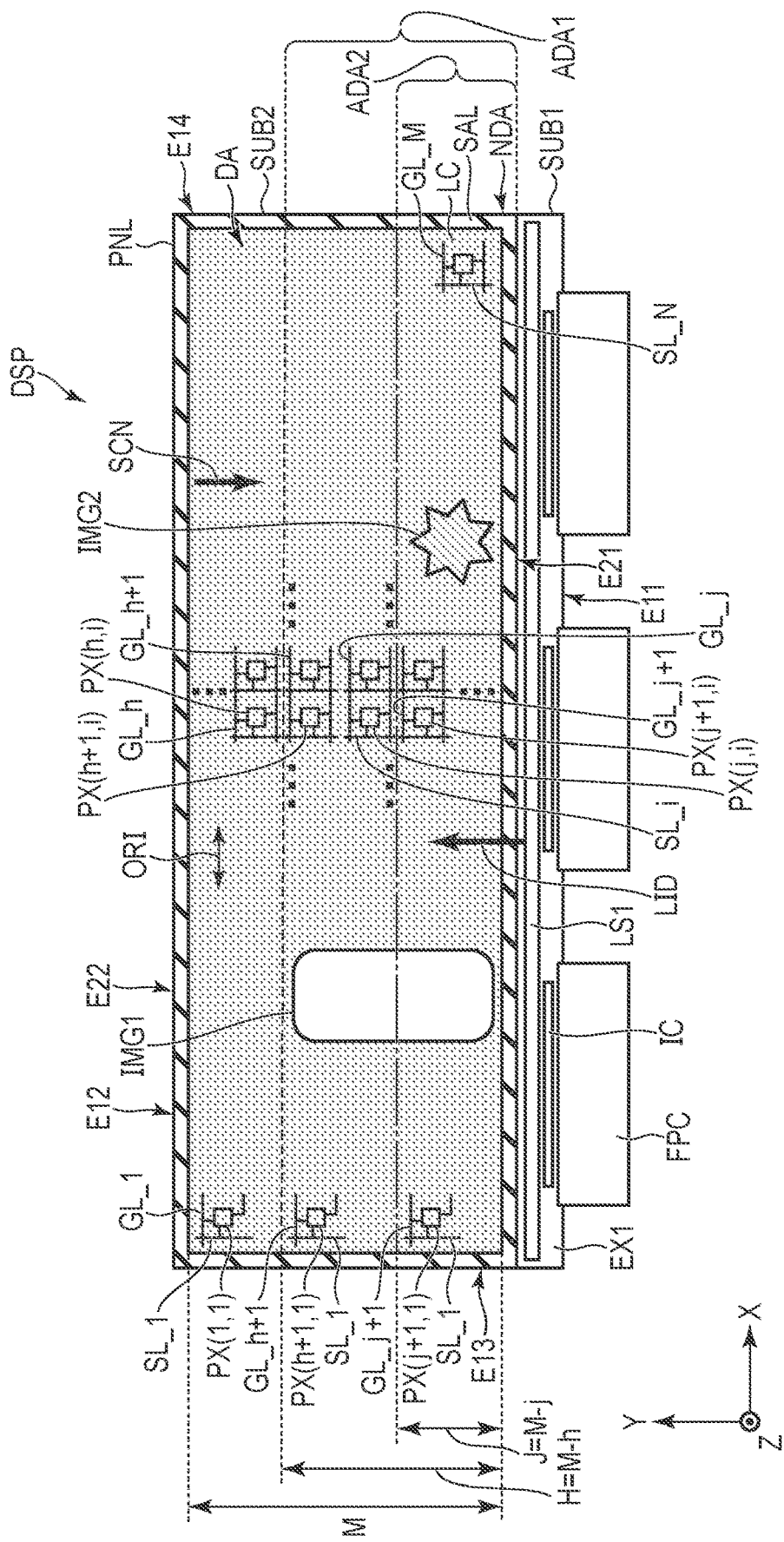
FIG. 16 is a plan view of another example of the structure of the display device of the embodiment.

FIG. 16 is a plan view of another example of the structure of the display device of the embodiment. In the example of FIG. 16, as compared to the example of FIGS. 1A to 1C, a light period of the light source element is changed in the halftone image display based on a distance from the light source element.

Note that the example of FIG. 16 can be applied to the aforementioned examples in addition to the example of FIGS. 1A to 1C.

In the display device DSP of FIG. 16, images IMG1 and IMG2 are displayed on the display area DA. The image IMG1 is a white display image, and the image IMG2 is a halftone image.

As described above, a difference between the brightness of the light entrance part side and the brightness of the opposed light entrance part side is relatively small in the white display image. Furthermore, in the black display image, a different between the brightness of the light entrance part side and the brightness of the opposed light entrance part side is not an issue.

On the other hand, a difference between the brightness of the light entrance part side and the opposed light entrance part side is great in the halftone image IMG2. Thus, in this example, in the area where the halftone image is displayed, the light period of the light source element LS is set longer. Thus, a difference between the brightness of the light entrance part side and the brightness of the opposed light entrance part side can be decreased, and the display quality can be improved.

Figure 17:
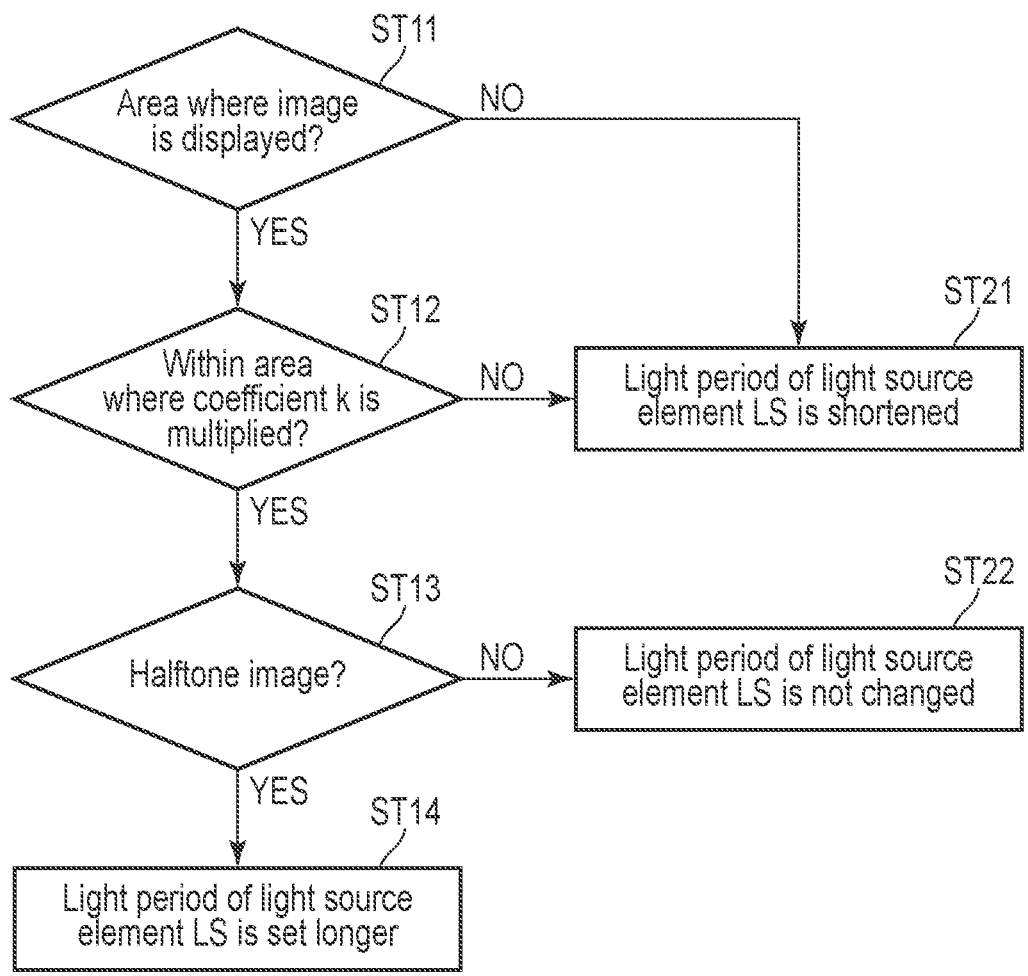
FIG. 17 is a flowchart of a process performed in the example.

FIG. 17 is a flowchart of the process of the present example.

As described above, the display driver of the display device DSP and the circuit element IC storing thereof are a controller configured to control the image display. The controller initially detects an area where an image is displayed (step ST11).

In the example of FIG. 16, an area ADA1 where the images IMG1 and IMG2 are displayed is an area of the scan lines GL_h+1 to GL_M. If the pixel PX connected to the scan line GL_1 and the signal line SL_1 is pixel PX (1, 1), the area ADA1 is an area where the pixels PX (h+1, 1) to (M, N) are arranged.

By multiplying the number H of the scan lines GL in the area ADA1 (H=M−h) with a coefficient k caused by the resolution, the number J (J=k×H) is derived, and whether the area is within the number J or not is determined (step ST12). With respect to the area, steps ST12 to ST14 are performed. These steps are performed in the area of the scan lines GL_j+i to GL_M, and the area is regarded as the area ADA2. In the area ADA2, pixels PX (j+1, 1) to (M, N) are arranged.

The number J of the scan lines GL subjected to the steps is (M−j), and J=(M−j)=k×(M−h).

Then, if the tone (gradation) of the image displayed in the area ADA2 is the maximum tone (white display), or the minimum tone (black display), or other tone (halftone) will be determined (step ST13). If the maximum tone or the minimum tone is not included in the tone, that is, if the image IMG2 is halftone, the light period of the light source element LS1 is set longer. In the example of FIG. 16, the controller sets the light period of the light source element LS1 longer since the halftone image IMG2 is included (step ST14).

If only the maximum tone or minimum tone image is displayed in the area ADA2, the light period of the light source element LS1 does not change (step ST22).

Furthermore, if the image determined in step ST11 is not displayed, and if the area of halftone image display determined in step ST12 is not the area ADA2 derived from number J multiplied with coefficient k, the light period of the light source element LS1 is shortened (step ST21).

As described above, in step ST13, if there is the halftone image IMG2 is in the area ADA2 which is from the light source element LS1 to the number J of the scan lines GL, the light period of the light source element LS1 is set longer. On the other hand, if there is a halftone image in the area distant from the area of the light source element LS1 to the number J, that is, in the area which is from the scan line GL_1 to the scan line GL_j, the light period of the light source element LS1 is shortened. That is, in the present example, the light period of the light source element LS1 is changed based on a distance from the light source element LS1 to a halftone display image.

Figure 18:
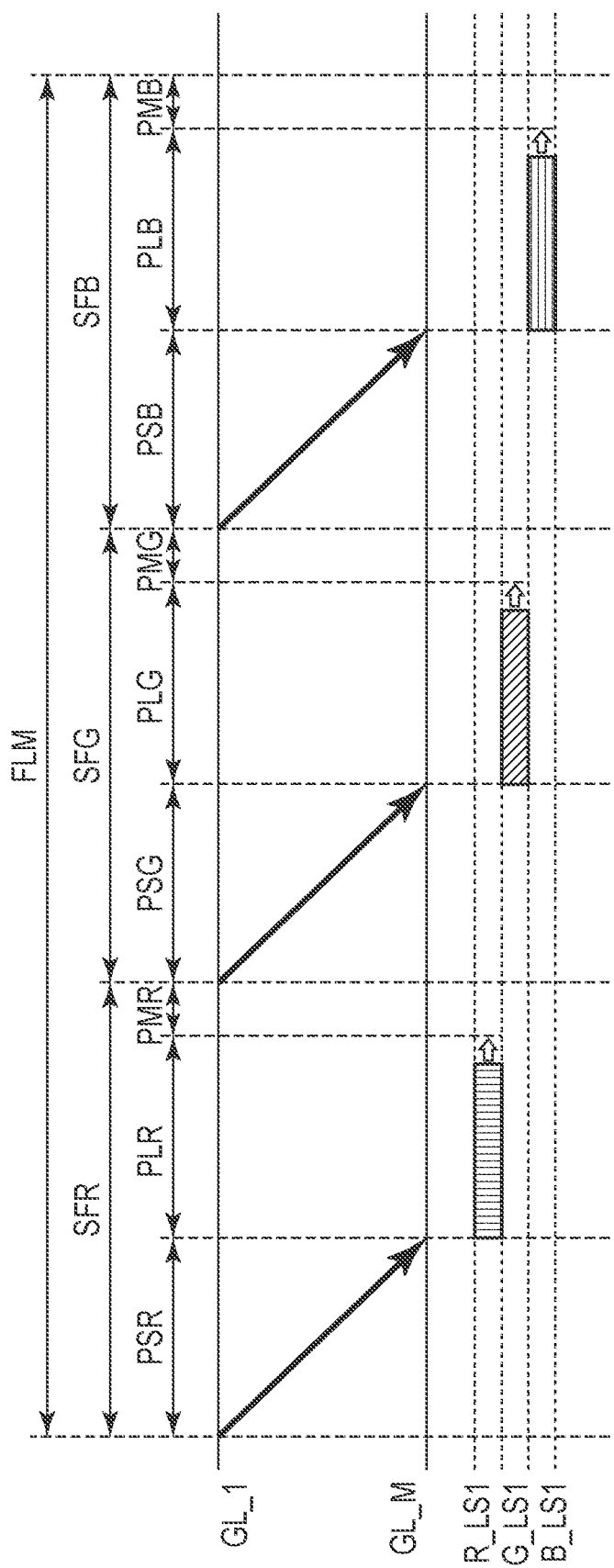
FIG. 18 illustrates a display operation of the display device.

FIG. 18 illustrate the display operation of the display device DSP. In step ST13, the light periods PLR, PLG, and PLB of the light source element LS1 are set longer as in FIG. 18. To balance with the longer light periods PLR, PLG, and PLB, reset periods PMR, PMG, and PMB are set shorter. In the example of FIG. 18, the subframe periods SFR, SFG, and SFB are the same as those of the example of FIG. 5.

In the display devices DSP of FIGS. 16 to 18, if the halftone image display is performed, the light period of the light source element LS is set longer than the normal state. Thus, a bias in the brightness of the displayed image is solved, and the display quality can be increased.

Structural Example 7

Figure 19:
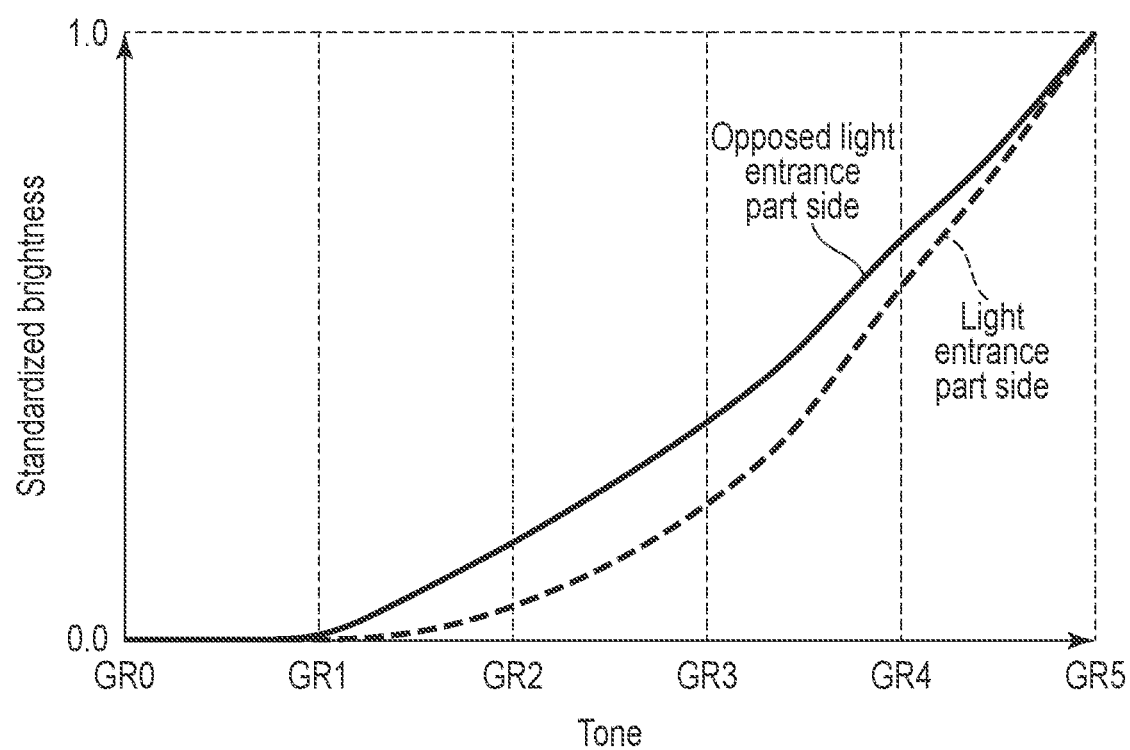
FIG. 19 illustrates another example of the structure of the display device of the embodiment.

FIG. 19 is a plan view of another example of the structure of the display device of the embodiment. In the present example, as compared to the example of FIGS. 1A to 1C, a light period of the light source element is changed based on a display tone of the image.

Note that the example of FIG. 19 can be applied to the aforementioned examples in addition to the example of FIGS. 1A to 1C.

In FIG. 19, an image displayed on the display device DSP includes ton GR0 to tone GR5. In FIG. 19, the brightness of the light entrance part side (side surface E21 side of FIG. 1A) is plotted in a dotted line, and the brightness of the opposed light entrance part side (side surface E22 side of FIG. 1A) is plotted in a solid line. The brightness of the light entrance part side and the brightness of the opposed light entrance part side are standardized such that their range is set between 0 and 1.

As in FIG. 19, in a halftone, especially between tones GR2 to GR3, a difference between the brightness of the light entrance part side and the brightness of the opposed light entrance part side becomes great. On the other hand, if the tone is high, for example, between tones GR4 and GR5, a difference between the brightness of the light entrance part side and the brightness of the opposed light entrance part side is small. Similarly, if the tone is low, for example, between tones GR0 and GR1, a difference between the brightness of the light entrance part side and the brightness of the opposed light entrance part side is small.

As described above, in the halftone, a voltage applied to the liquid crystal layer LC is low, and the movement of the liquid crystal molecules LCM is slow. Since the movement of the liquid crystal molecules LCM is slow, a difference between the brightness of the light entrance part side and the brightness of the opposed light entrance part side becomes great. On the other hand, if the tone is high, a voltage applied to the liquid crystal layer LC is high, and thus, a response speed of the liquid crystal molecules LCM is fast. Since the response speed of the liquid crystal molecules LCM is fast, the brightness difference becomes small. Furthermore, if the tone is low, there is no need of movement of the liquid crystal molecules LCM, and thus, the response speed of the liquid crystal molecules LCM is fast. In that case, the brightness difference becomes small, too.

In consideration of the above, in the halftone, for example, between tones GR2 to GR3, the light period of the light source element LS to illuminate the area of the displayed image is set longer than the maximum tone and the minimum tone images. That is, the light period of the area where the halftone image is displayed is longer than that of the area where the maximum tone image is displayed, and the light period of the area where the halftone image is displayed is longer than that of the area where the minimum tone image is displayed. With the longer light period, the light amount scattered by the liquid crystal layer LC becomes great, and the brightness of the light entrance part side can be especially high. Thus, in the halftone image display, a difference between the brightness of the light entrance part side and the brightness of the opposed light entrance part side can be small.

Or, the light period of the light source element LS may be gradually increased when reaching the area where the halftone image is displayed from the area where the maximum tone image is displayed, or when reaching the area where the halftone image is displayed from the area where the minimum tone image is displayed.

Note that, in the period to illuminate the area where the halftone image is not displayed, the light period of the light source element LS is not changed. Specifically, in the area where the image of tones GR0 to GR1, and GR4 to GR5 is displayed, the light period of the light source element LS is normal.

In the display device of FIG. 19, the light period of the light source element LS is set longer in the halftone image display as compared to the maximum tone image display and the minimum tone image display. Thus, a bias in the brightness of the displayed image is solved, and the display quality can be increased.

Structural Example 8

Figures 20A, 20B, 20C:
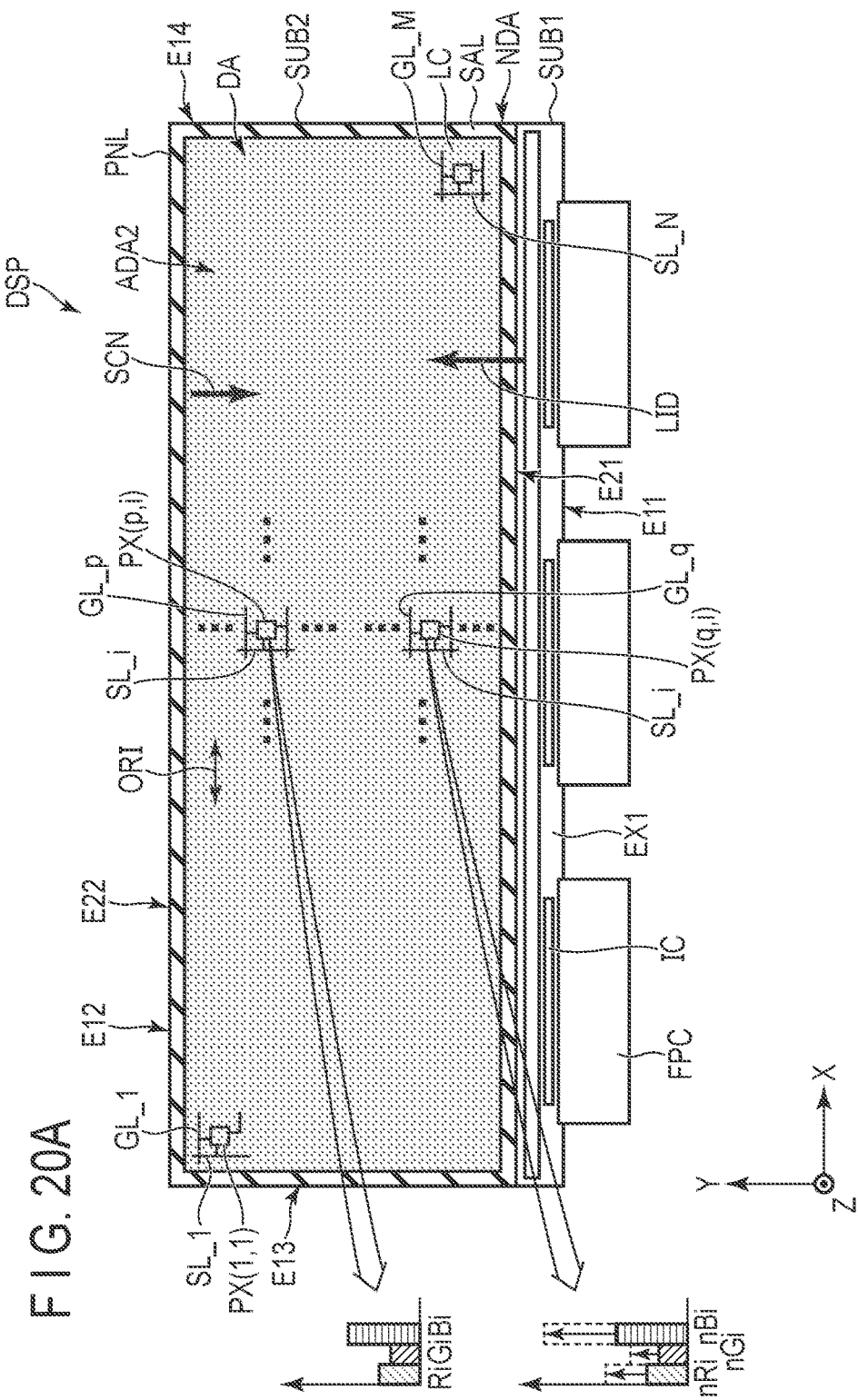
FIG. 20A illustrates another example of the structure of the display device of the embodiment.
FIG. 20B illustrates another example of the structure of the display device of the embodiment.
FIG. 20C illustrates another example of the structure of the display device of the embodiment.

FIGS. 20A to 20C are plan views of another example of the structure of the display device of the embodiment. In the present example, as compared to the example of FIGS. 1A to 1C, an input tone value to pixels is changed based on a distance from the light source element.

Note that the example of FIGS. 20A to 20C can be applied to the aforementioned examples in addition to the example of FIGS. 1A to 1C.

FIG. 20A is a plan view of the display device of the present example. In the example of FIG. 20A, the display device DSP includes a pixel PX (p, i) and a pixel PX (q, i) in the display area DA. The pixel PX (p, i) is electrically connected to the scan line GL_p and the signal line SL_i, and the pixel PX (q, i) is electrically connected to the scan line GL_q and the signal line SL_i. The scan line GL_q is closer to the light source element LS (light source element LS1) than is the scan line GL_p. That is, the pixel PX (q, i) is closer to the light source element LS than is the pixel PX (p, i).

FIG. 20B indicates input tone values (Ri, Gi, and Bi) of the pixel PX (p, i). FIG. 20C indicates input tone values of the pixel PX (q, i). Note that Ri is red (R) input tone value, Gi is green (G) input tone value, and Bi is blue (B) input tone value.

As in FIG. 19, in the halftone image display, a difference between the brightness of the light entrance part side and the brightness of the opposed light entrance part side is great. Furthermore, the standardized brightness is lower in the light entrance part side than the opposed light entrance part side. Thus, in the halftone image display, an input tone value (nRi, nGi, and nBi) which is n-fold value of the input tone value (Ri, Gi, and Bi) to be originally input is input to the pixel PX (q, i) in the light entrance part side (where n is an integer). On the other hand, in the halftone image of the opposed light entrance part side is input, the input tone value (Ri, Gi, and Bi) to be originally input is input as is.

In the example of FIGS. 20A to 20C, the input tone value is increased with respect to two pixels PX in the light entrance part side and the opposed light entrance part side; however, no limitation is intended thereby. The input tone may be gradually changed based on a distance from the light source element LS. Or, a value to be multiplied may be changed based on the halftone to be displayed. Note that the value n to be multiplied is, preferably, a value which does not change chromaticity from the original image.

In the display device DSP of FIGS. 20A to 20C, the input tone value is multiplied by n based on a distance from the light source element LS. Thus, the brightness of the halftone image to be displayed is increased. Thus, a bias in the brightness of the displayed image is solved, and the display quality can be increased.

In the present example, the same advantages as in the embodiment can be achieved.

Structural Example 9

Figure 21:
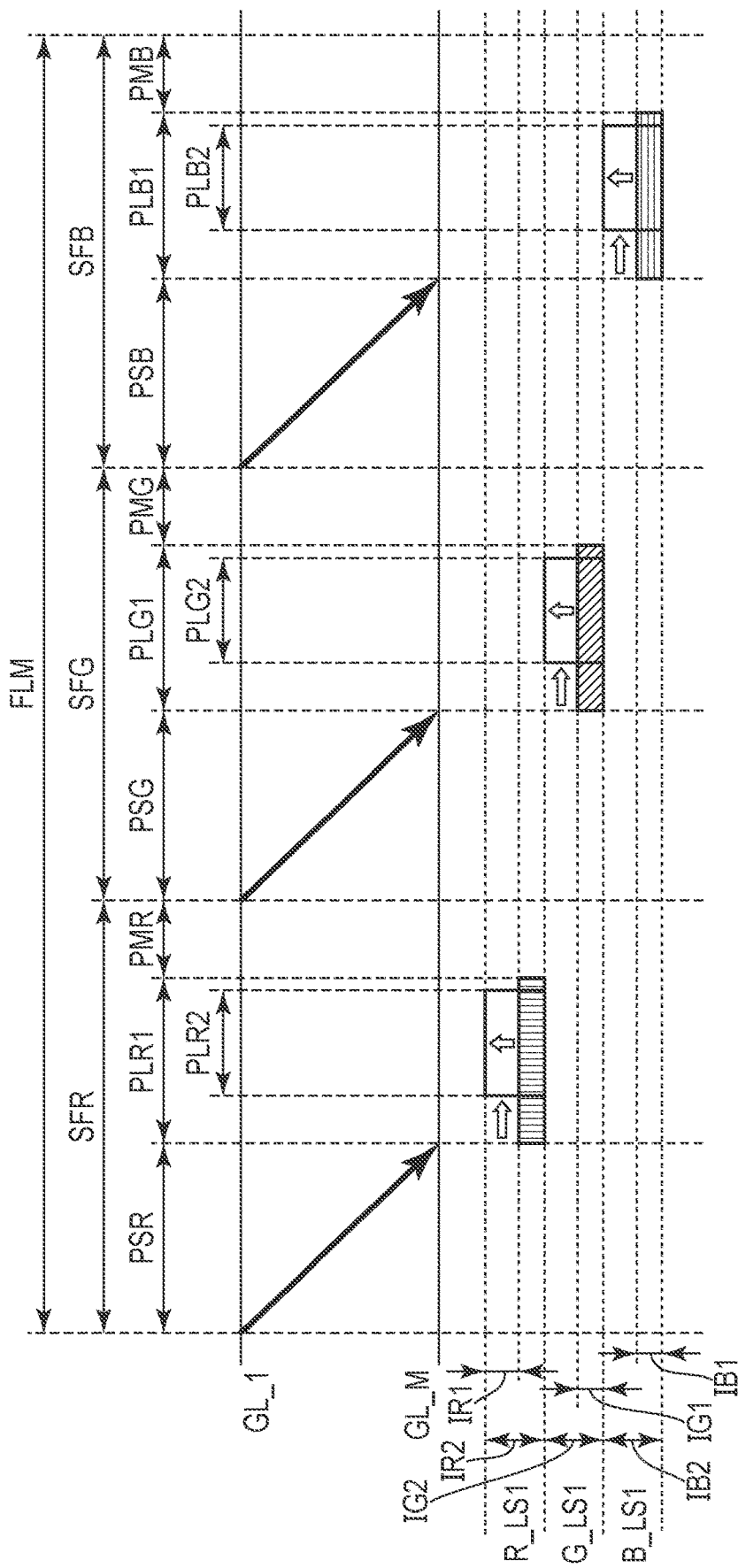
FIG. 21 illustrates another example of the structure of the display device of the embodiment.

FIG. 21 is a plan view of another example of the structure of the display device of the embodiment. In the present example, as compared to the example of FIG. 5, a light period of the light source element is delayed, and a current value to be supplied to the light source element is increased as compensation.

Note that the example of FIG. 21 can be applied to the aforementioned examples in addition to the example of FIGS. 1A to 1C.

FIG. 21 is a timing chart of the present example. Periods PLR1, PLG1, and PLB1 of FIG. 21 are the same as the periods PLR, PLG, and PLB, respectively, as the light periods of FIG. 5.

In FIG. 21, the time to start the illumination of the red light source element R_LS1, green light source element G_LS1, and blue light source element B_LS1 is delayed by the rightward arrow as compared to the example of FIG. 5.

As described above, in the halftone image display, a period from the application of voltage to the change of the alignment direction is long in the liquid crystal molecules LSM. Thus, in the area where the halftone image display is performed, a time to start the illumination of the light source element LS (light source elements R_LS1, G_LS1, and B_LS1) is delayed to manage the period form the application of voltage to the change of the alignment direction.

However, when the light period of the light source element LS is delayed, the light period is shortened. The light period of the light source element R_LS1, G_LS1, and B_LS1 in FIG. 21 are periods PLR2, PLG2, and PLB2. The periods PLR2, PLG2, and PLB2 are shorter than the periods PLR1, PLG1, and PLB1, respectively. If the light period is short, the light amount from the light source element LS is decreased accordingly. Thus, the brightness may possibly become insufficient. To avoid this, in the example of FIG. 21, the current value supplied to the light source element LS is increased by the upward arrow.

The light amount of the light source elements R_LS1, G_LS1, and B_LS1 of FIG. 21 is the product of the light period and the current value. The current values to be supplied to the light source elements R_LS1, G_LS1, and B_LS1 in the periods PLR, PLG, and PLB of FIG. 5, that is, in the periods PLR1, PLG1, and PLB1 of FIG. 21 are set as current values IR1, IG1, and IB1. In FIG. 21, the current values supplied to the light source elements R_LS1, G_LS1, and B_LS1 in the periods PLR2, PLG2, and PLB2 are set as current values IR2, IG2, and IB2. The current values IR2, IG2, and IB2 are higher than the current values IR1, IG1, and IB1, respectively.

Here, the current value IR2 is determined such that the product of the period PLR1 and the current value IR1 is equal to the product of the period PLR2 and the current value IR2. The current value IG2 is determined such that the product of the period PLG1 and the current value IG1 is equal to the product of the period PLG2 and the current value IG2. The current value IB2 is determined such that the product of the period PLB1 and the current value IB1 is equal to the product of the period PLB2 and the current value IB2. Thus, the light amount of the light source elements R_LS1, G_LS1, and B_LS1 becomes equal to the light amount of FIG. 5.

Furthermore, the end time of the illumination of the periods PLR2, PLG2, and PLB2 as light periods are faster than the periods PLR1, PLG1, and PLB1. Since the current value supplied to the light source elements LS is high, the illumination brightness of the light source elements LS becomes high. Thus, there may possibly be light leaking in the area closer to the light source elements LS.

In the display device DSP of FIG. 21, the light period of the light source element LS is delayed in the area where the halftone image display is performed, and the current value supplied to the light source element LS is increased. Thus, a period required for the change of the alignment direction of the liquid crystal molecules LSM can be secured. Thus, the brightness of the image to be displayed can be increased, and a bias in the brightness of the displayed image is solved. Thus, the display quality can be increased.

Structural Example 10

Figure 22:
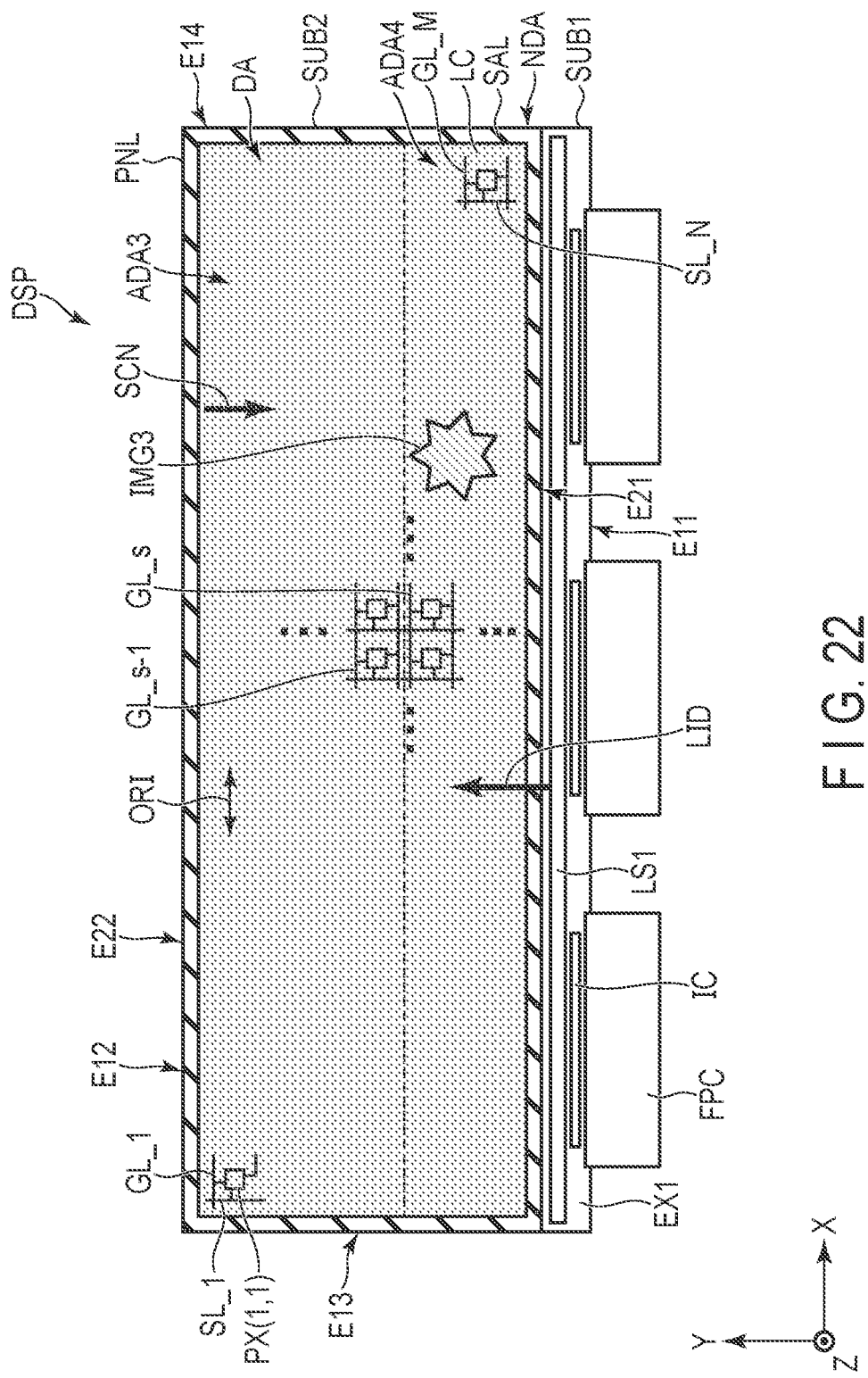
FIG. 22 illustrates another example of the structure of the display device of the embodiment.

FIG. 22 illustrates another example of the structure of the display device of the embodiment. In the present example, as compared to the example of FIG. 5, a voltage applied to the liquid crystal layer is increased after a specific row.

Note that the example of FIG. 22 can be applied to the aforementioned examples in addition to the example of FIG. 5.

In the example of FIG. 22, of the display area DA, the area from the scan line GL_1 to GL_s−1 is regarded as area ADA3, and the area from the scan line GL_s to GL_M is regarded as area ADA4. The area ADA3 is further distant from the light source element LS1 than is the area ADA4. In other words, the area ADA4 is closer to the light source element LS1 than is the area ADA3. In FIG. 22, the halftone image IMG3 is displayed in the area from the scan line GL_s to GL_M in the display area DA, that is, in the area ADA4.

FIG. 23 illustrate a display operation of the present example. In FIG. 23, overdrive is performed after the scan line GL_s. This will be described in detail later.

In FIG. 23, the normal display operation is performed in the area ADA3 which does not include the halftone image IMG3 (area from scan line GL_1 to GL_s−1). However, as in FIG. 23, the overdrive is performed in the area ADA4 which displays the halftone image IMG3 (area from scan line GL_s to GL_M). That is, to the pixels PX connected to scan lines GL_M to GL_M, a voltage of greater amplitude than that of the image signals used in the normal display is applied. Thus, the voltage applied to the liquid crystal layer LC becomes a high voltage.

In the normal display operation, in the halftone, a voltage applied to the liquid crystal layer LC is low, and the movement of the liquid crystal molecules LCM is slow. However, in the present example, a voltage higher than that of the normal display operation is applied to the liquid crystal layer LC in the area ADA4 to display the halftone image IMG3. Thus, a response speed of the liquid crystal molecules LCM becomes fast, and the brightness of the image IMG3 to be displayed becomes high.

Note that, the overdrive of FIG. 23 may be combined with a drive to delay the time to start the illumination of the light source element LS and to increase the current value of the light source element LS.

The present example can achieve the same advantages of the embodiment.

Structural Example 11

FIGS. 24A to 24C illustrate another example of the structure of the display device of the embodiment. In the present example, as compared to the example of FIG. 22, a channel width of TFT as the switching element is increased after a specific row.

Note that the example of FIGS. 24A to 24C can be applied to the aforementioned examples in addition to the example of FIG. 22.

FIG. 24A is a plan view illustrating pixels of the present example. In the example of FIG. 24A, the display device DSP includes a pixel PX (t−1, i) and a pixel PX (t, i) in the display area DA. The pixel PX (t−1, i) includes a scan line GL_t−1, signal line SL_i, and switching element SW (t−1, i) electrically connected to the scan line GL_t−1 and the signal line SL_i. The pixel PX (t, i) includes a scan line GL_t, signal line SL_i, and switching element SW (t, i) electrically connected to the scan line GL_t and the signal line SL_i.

Note that, in FIG. 24A, the scan line GL_s of FIG. 22 is interpreted as the scan line GL_t, and the halftone image display is performed in the area from the scan line GL_t to the scan line GL_M (corresponding to the area ADA4 of FIG. 22). Thus, in the present example, the parts same as those of FIG. 22 will be used if necessary and the detailed description thereof will be omitted.

FIG. 24B is a plan view of the switching element SW (t−1, i) in an enlarged manner. The switching element SW (t−1, i) is a thin film transistor (TFT) including a semiconductor layer SC, gate electrode GE, source electrode SE, and drain electrode DE. The gate electrode GE is formed integrally with the scan line GL_t−1. The semiconductor layer SC overlaps the gate electrode GE disposed below.

FIG. 24C is a plan view of the switching element SW (t, i) in an enlarged manner. The switching element SW (t, i) is a thin film transistor (TFT) including a semiconductor layer SC, gate electrode GE, source electrode SE, and drain electrode DE. The gate electrode GE is formed integrally with the scan line GL_t. The semiconductor layer SC overlaps the gate electrode GE disposed below.

In the switching elements SW (t−1, i) and (t, i), two source electrodes SE are each formed integrally with the signal line SL_i, disposed above the semiconductor layer SC, and contact the semiconductor layer SC. The drain electrode DE is positioned between two source electrodes SE, is disposed above the semiconductor layer SC, and contacts the semiconductor layer SC. The drain electrode DE is electrically connected to the pixel electrode PE of FIGS. 1A to 1C.

In the example of FIG. 24B, the channel width CW1 of the switching element SW (t−1, i) is a length from an end of the source electrode SE to an end of the drain electrode DE in the first direction X.

Similarly, in the example of FIG. 24C, the channel width CW2 of the switching element SW (t, i) is a length from an end of the source electrode SE to an end of the drain electrode DE in the first direction X.

As in FIGS. 24B and 24C, the channel width CW2 of the switching element SW (t, i) is longer than the channel width CW1 of the switching element SW (t−1, i). By increasing the channel width CW2, a voltage to be applied to the switching element SW (t, i) (TFT) can be increased. Furthermore, with the pixel electrode PE electrically connected to the switching element SW (t, i), a higher voltage can be applied to the liquid crystal layer LC.

In the normal display operation, a voltage to be applied to the liquid crystal layer LC is low in the halftone, and the movement of the liquid crystal molecules LCM is slow. However, in the present example, in the area where the halftone image is displayed (area from scan lien GL_t to scan lien GL_M, which corresponds to area ADA4 of FIG. 22), a voltage higher than that of the normal display operation is applied to the liquid crystal layer LC. Thus, the response speed of the liquid crystal molecules LCM becomes fast, and the brightness of the image to be displayed becomes high.

The present example can achieve the same advantages of the embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a display area including a plurality of scan lines, signal lines, and pixels;
a first side surface and a second side surface opposed to each other, the first side surface being positioned along a part of a first end of the display area, and the second side surface being positioned along a part of a second end of the display area;
a light source element disposed to be adjacent to the first side surface; and
a liquid crystal layer disposed in the display area, the liquid crystal layer including a polymer and a liquid crystal molecule, wherein
when a direction of light incident on the display area from the light source element is defined as an incident direction and a direction in which the pixels are selected sequentially is defined as a scan direction, the incident direction is opposite to the scan direction, and
a direction in which the polymer extends linearly crosses both the incident direction and the scan direction,
wherein
the plurality of pixels include a plurality of switching elements, and
a channel width of the switching element of an area closer to the light source element of the display area is greater than a channel width of the switching element of an area distant from the light source element of the display area.

2. The display device according to claim 1, wherein a light on period of the light source element is changed based on a gap between the light source element and a halftone image.

3. The display device according to claim 1, wherein a light on period of the light source element to illuminate an area to display a halftone image is longer than a light on period of the light source element to illuminate an area to display images of the maximum tone and the minimum tone.

4. The display device according to claim 1, wherein, when a halftone image is displayed in an area closer to the light source element in the display area, an input tone value of the halftone image is an integer fold of the input tone value in a case where the halftone image is displayed in an area distant from the light source element.

5. The display device according to claim 1, wherein, in an area where a halftone image is displayed in the display area, a light on period of the light source element is delayed, and a current value supplied to the light source element is increased.

6. The display device according to claim 1, wherein, when a halftone image is displayed in an area closer to the light source element in the display area, a voltage having a greater amplitude than that of an image signal is applied to the pixels in the area closer to the light source element.

7. The display device according to claim 1, further comprising a circuit element, wherein
the circuit element is disposed to be adjacent to the first side surface.

8. The display device according to claim 1, further comprising a circuit element, wherein
the circuit element is disposed to be adjacent to the second side surface.

9. The display device according to claim 1, wherein the first side surface and the second side surface are side surfaces formed along a long side of the display area.

10. The display device according to claim 1, wherein the first side surface and the second side surface are side surfaces formed along a short side of the display area.

11. A display device comprising:
a display area including a plurality of scan lines, signal lines, and pixels;
a first side surface and a second side surface opposed to each other, the first side surface being positioned along a part of a first end of the display area, and the second side surface being positioned along a part of a second end of the display area;
a first light source element and a second light source element disposed to be adjacent to the first side surface and the second side surface, respectively; and
a liquid crystal layer disposed in the display area, the liquid crystal layer including a polymer and a liquid crystal molecule, wherein
brightness of the first light source element is higher than brightness of the second light source element,
when a direction of light incident on the display area from the first light source element is defined as a first incident direction, a direction of light incident on the display area from the second light source element is defined as a second incident direction, and a direction in which the pixels are selected sequentially is defined as a scan direction,
the first incident direction is opposite to the scan direction, and
a direction in which the polymer extends linearly crosses the first incident direction, second incident direction, and the scan direction,
wherein
the plurality of pixels include a plurality of switching elements, and
a channel width of the switching element of an area closer to the light source element of the display area is greater than a channel width of the switching element of an area distant from the light source element of the display area.

12. A display device comprising:
a display area including a plurality of scan lines, signal lines, and pixels;
a first side surface and a second side surface opposed to each other, the first side surface being positioned along a part of a first end of the display area, and the second side surface being positioned along a part of a second end of the display area;
a first light source element and a second light source element disposed to be adjacent to the first side surface and the second side surface, respectively; and
a liquid crystal layer disposed in the display area, the liquid crystal layer including a polymer and a liquid crystal molecule, wherein
the plurality of scan lines include a first scan line group closer to the first light source element than to the second light source element, and a second scan line group closer to the second light source element than to the first light source element,
the plurality of pixels include a first pixel group connected to the first scan line group and a second pixel group connected to the second scan line group,
when a direction of light incident on the display area from the first light source element is defined as a first incident direction, a direction of light incident on the display area from the second light source element is defined as a second incident direction, a direction of in which pixels in the first pixel group selected sequentially is defined as a first scan direction, and a direction in which pixels in the second pixel group selected sequentially is defined as a second scan direction, the first incident direction is opposite to the first scan direction, and the second incident direction is opposite to the second scan direction, and a direction in which the polymer extends linearly crosses the first incident direction, second incident direction, first scan direction, and second scan direction.

13. The display device according to claim 12, wherein brightness of the first light source element and brightness of the second light source element are equal, and the number of the scan lines of the first scan line group and the number of the scan lines of the second scan line group are equal.

14. The display device according to claim 12, wherein brightness of the first light source element and brightness of the second light source element are different, and a ratio of the scan lines of the first scan line group in number and the scan lines of the second scan line group in number is equal to a ratio of the brightness of the first light source element and the brightness of the second light source element.

* * * * *